United States Patent [19]
Rawlings, III

[11] Patent Number: 5,987,627
[45] Date of Patent: Nov. 16, 1999

[54] METHODS AND APPARATUS FOR HIGH-SPEED MASS STORAGE ACCESS IN A COMPUTER SYSTEM

[76] Inventor: Joseph H. Rawlings, III, 7427 SW. 34th, Portland, Oreg. 97219

[21] Appl. No.: 07/968,044

[22] Filed: Oct. 27, 1992

Related U.S. Application Data

[63] Continuation-in-part of application No. 07/882,430, May 13, 1992, Pat. No. 5,479,656.

[51] Int. Cl.$^6$ .................................................... G06F 11/00
[52] U.S. Cl. ............................................. 714/48; 711/100
[58] Field of Search ..................................... 711/100, 101, 711/105, 111, 112, 170, 171; 714/48, 1, 27

[56] References Cited

U.S. PATENT DOCUMENTS

| 3,820,085 | 6/1974 | Zelinski | 340/172.5 |
| 4,410,942 | 10/1983 | Milligan et al. | 364/200 |
| 4,672,613 | 6/1987 | Foxworthy et al. | 371/38.1 |
| 5,020,020 | 5/1991 | Pomfret et al. | 364/900 |

*Primary Examiner*—Hoa T. Nguyen
*Attorney, Agent, or Firm*—Marger, Jacobson & McCollom, P.C.

[57] ABSTRACT

An apparatus called a DataPort is disclosed for use in conjunction with a computer. The DataPort includes a private memory comprised of a high-speed, solid-state random access memory array. A public memory comprising a series of registers serves as an intermediary between the private memory array and a computer CPU local bus for memory access operations. The public memory includes staging registers which are used for conversion between the CPU local bus word size and the internal private memory word size as may be necessary, including pipelining as required. The DataPort also generates error correction codes (ECC) and stores the correction codes in the private memory, interleaved with data received from the CPU local bus, and checks the ECC codes to detect errors when data is read back out to the bus. The DataPort has the advantages of providing a high-speed, variable packet length, error-corrected access to a memory array at the CPU local bus operating speed, so that the device can be used with no wait states for improved throughput in a computer system.

27 Claims, 15 Drawing Sheets

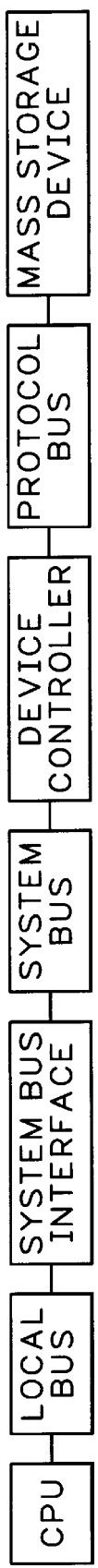
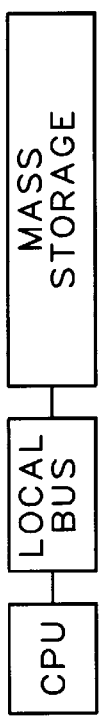
FIG.1 (PRIOR ART)
FIG.2
FIG.3

MASS STORAGE DATA PARAGRAPH
(D IS DATA, E IS ERROR CORRECTION CODE)

| BIT | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| CONTAINS | D | D | D | D | D | D | D | D | E | D | D | D | D | D | D | D | D | E |
| BIT | 18 | 19 | 20 | 21 | 22 | 23 | 24 | 25 | 26 | 27 | 28 | 29 | 30 | 31 | 32 | 33 | 34 | 35 |
| CONTAINS | D | D | D | D | D | D | D | D | E | D | D | D | D | D | D | D | D | E |
| BIT | 36 | 37 | 38 | 39 | 40 | 41 | 42 | 43 | 44 | 45 | 46 | 47 | 48 | 49 | 50 | 51 | 52 | 53 |
| CONTAINS | D | D | D | D | D | D | D | D | E | D | D | D | D | D | D | D | D | E |
| BIT | 54 | 55 | 56 | 57 | 58 | 59 | 60 | 61 | 62 | 63 | 64 | 65 | 66 | 67 | 68 | 69 | 70 | 71 |
| CONTAINS | D | D | D | D | D | D | D | D | E | D | D | D | D | D | D | D | D | E |

FIG.6

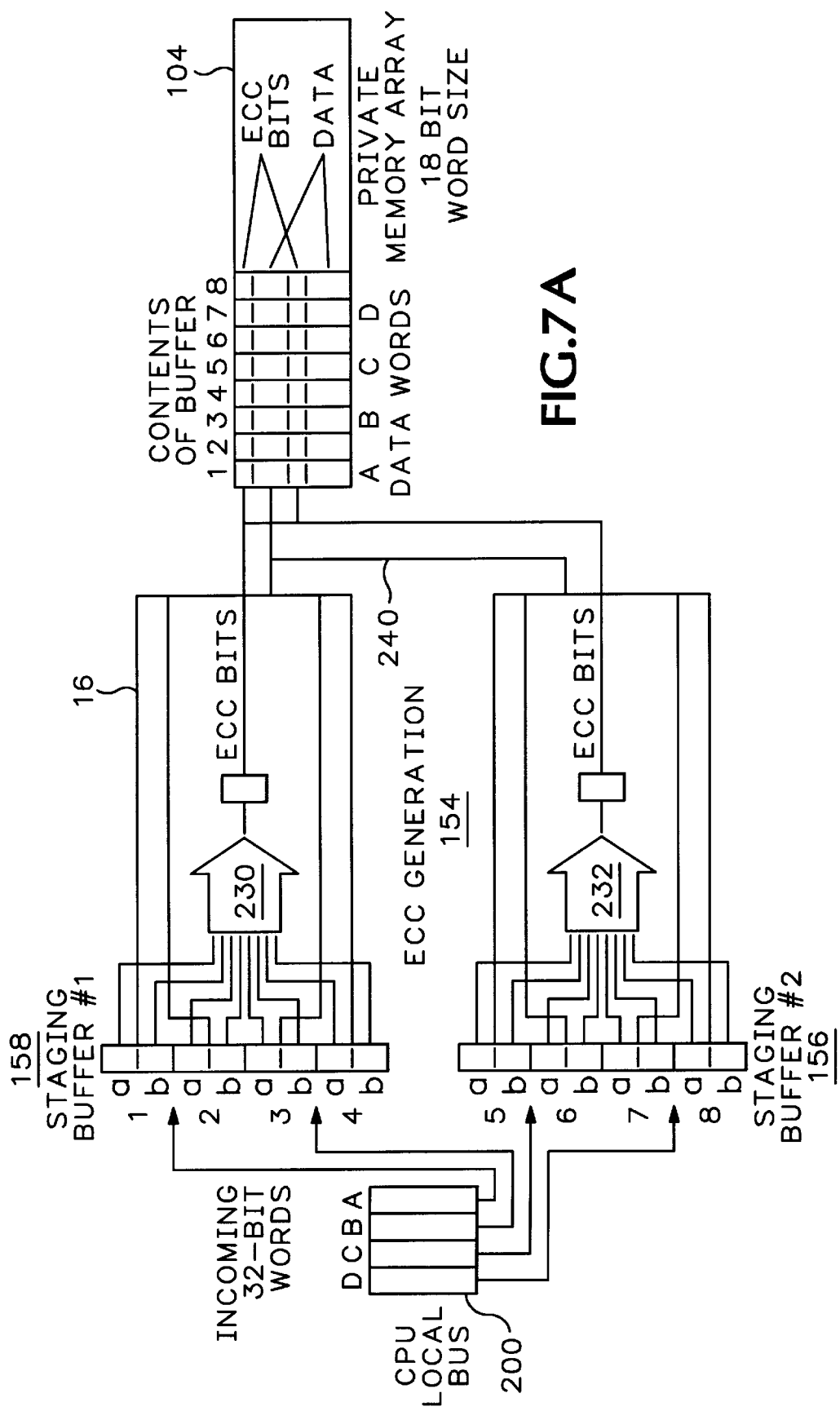

METHODS AND APPARATUS FOR HIGH-SPEED MASS STORAGE ACCESS IN A COMPUTER SYSTEM

RELATED APPLICATION DATA

This application is a continuation-in-part of commonly-owned, application Ser. No. 07/882,430 filed May 13, 1992 entitled "Computer File System and Automatic Optimization," now U.S. Pat. No. 5,479,656. The said application is hereby incorporated herein by this reference in its entirety. The parent application generally is directed to new and improved methods and apparatus for a high-speed file system for a computer system. This application is directed to improved methods and apparatus for high-speed storage access. While either invention may be used to advantage independently of the other, a combination of the new file system and new data access techniques is preferred, as together these innovations will yield extraordinary improvements in computer system throughput.

FIELD OF THE INVENTION

This invention relates to the field of computer systems data storage, and specifically to providing very high-speed access to data stored in continuously error-corrected, solid-state memory through fixed or variable length data packets.

BACKGROUND—DISCUSSION OF PRIOR ART

Most computers presently exhibit performance limitations that arise from neither the CPU performance nor the operating speeds of memory devices. Rather, a computer's real performance, i.e. its useful throughput, is severely limited by the relatively slow speed of accessing memory devices. In other words, there exists a serious "bottle neck" between the CPU and the mass storage devices which slows overall system performance. What is needed is to improve overall system performance by speeding the access time to and transfer of data between the CPU (or local RAM) and a mass storage device.

Known Protocols and Device Controllers

Heretofore, access to mass data storage has been limited to devices that use high and low-level protocols and their supporting hardware. Disk drives, for example, communicate with the computer system through high and low-level protocols implemented in a combination of hardware and software, sometimes called a device controller.

The device controller, as such, acts as interpreter between the computer system and the storage device. For the computer system to transmit data to, or receive data from a storage device (e.g. a disk drive), the sequence of high-level protocol steps listed in the following Table 1 are carried out:

TABLE 1

| Generic High-Level Protocol |
|---|
| 1. Computer transmits command and data address to controller via system bus. |
| 2. Controller reads command and decodes device and data addresses. |
| 3. Controller translates system command into protocol commands. |
| 4. Controller transmits protocol commands to referenced device. |
| 5. Device responds to commands. |
| 6. Controller transmits "ready to receive" to sending device. |
| 7. Controller receives data from sending device. |
| 8. Controller transmits "ready to send" to receiving device. |

TABLE 1-continued

| Generic High-Level Protocol |
|---|
| 9. Controller awaits "ready to receive". |
| 10. Controller transmits data to receiving device. |

The basic protocol described above is repeated until the command is completed and is true whether the command is a READ or WRITE. Some kind of protocol is required to allow one device to communicate with another device. The device controller communicates with the storage device through one of several protocol definitions. The protocol is time consuming and thus slows the overall system. Examples of known high-level device controller to storage device protocols are SCSI (Small Computer Systems Interface), IDE (Integrated Drive Electronics), ESDI (Enhanced Small Device Interface), ST506 (a hard disk drive model number designation) and SCSI II (Small Computer Systems Interface ver. II).

Low level protocols are implemented at the basic hardware communications level where one device communicates with another device through a hardware medium. High level protocols always embed low level protocols to handle the low level communications between the controller and the device.

An example of a high level controller to storage device protocol with embedded low level protocols is shown in Table 2 below. Table 2 illustrates a SCSI system as defined in the American National Standard X3.131-1986 during a simple READ command. Here, the INITIATOR device is the SCSI controller and the TARGET device is a SCSI disk drive.

TABLE 2

SCSI Read Protocol Overhead

| BUS PHASE | ACTION |
|---|---|
| Bus-Free | Wait for Bus Free condition. |
| Arbitration | INITIATOR drives BSY signal, places ID on bus |
| | INITIATOR determines priority |
| | INITIATOR drives SEL signal active |
| Selection | INITIATOR releases BSY |
| | INITIATOR sets TARGET ID and own ID on data bus |
| | INITIATOR drives I/O signal inactive |
| | INITIATOR asserts ATN signal |
| | INITIATOR waits for TARGET to drive BSY signal |
| Message Out | TARGET drives C/D and MSG signals active |
| | INITIATOR sends IDENTIFY to indicate logical unit |
| Command | TARGET asserts C/D signal |
| | TARGET negates I/O and MSG signal |
| | INITIATOR sends (READ) command (REC/ACK handshake) |
| | TARGET disconnects, asserts C/D, I/O and MSG signals |
| | INITIATOR reads disconnect (REC/ACK handshake) |
| | TARGET disconnects |
| Arbitration | TARGET drives BSY and ID active |
| Reselection | TARGET drives INITIATOR ID active |
| | TARGET drives SEL and I/O active |
| | TARGET releases BSY |
| | INITIATOR detects reselection |
| | INITIATOR asserts BSY |
| | TARGET drives BSY active and releases SEL |
| | INITIATOR detects SEL change |
| | INITIATOR releases BSY (BSY held active by TARGET) |
| Message In | TARGET drives C/D, I/O and MSG signals active |
| | TARGET writes byte on data bus (Logical ID of reselecting unit) |
| | TARGET asserts REQ (start of REQ/ACK handshake) |
| | INITIATOR reads byte |
| | INITIATOR asserts ACK |

TABLE 2-continued

SCSI Read Protocol Overhead

| BUS PHASE | ACTION |
|---|---|
| | TARGET reads ACK and releases REQ |
| | INITIATOR detects REQ change and releases ACK |
| Data In | TARGET drives I/O active |
| | TARGET drives C/D and MSG signals inactive |
| Data transfer | TARGET writes byte to bus |
| (loop) | TARGET asserts REQ |
| | INITIATOR reads byte |
| | INITIATOR asserts ACK |
| | TARGET releases REQ |
| | INITIATOR releases ACK |
| Status | TARGET asserts C/D and I/O signals |
| | TARGET negates the MSG signal |
| | TARGET places status byte on bus |
| | TARGET asserts REQ |
| | INITIATOR reads byte |
| | INITIATOR asserts ACK |
| | TARGET releases REQ |
| | INITIATOR releases ACK |
| Bus Free | TARGET releases all asserted signals |
| | INITIATOR and TARGET disconnect. |

It may be observed from the foregoing example that known protocols cause significant delay in every mass storage access operation.

System Bus and CPU Local Bus Architectures

In general, a storage device controller (e.g., a disk drive controller) communicates with another controller type, such as the direct memory access (DMA) controller or the central processing unit (CPU), through a low level protocol implemented over the system bus. Examples of system bus architectures are the Industry Standard Architecture (ISA) and Extended Industry Standard Architecture (EISA). Additionally, there are many vendor-specific system bus architectures.

Data storage devices thus are isolated from the computer's system bus by the communications and high and low-level protocols implemented in the device controller. The device controller is isolated from the system's CPU and memory residing on the CPU local bus by a system bus interface and low-level protocols. This conventional architecture is illustrated in FIG. 1. Therefore, for the CPU to access stored data, the related commands and all transferred data must traverse multiple protocol levels. Computer systems can only access a disk drive through several protocols. Each protocol level, however, interjects delays and overhead. The overall effect upon the system is that system data throughput is bottlenecked at the protocol level. What is needed is to speed data transfer between the CPU and a storage device by reconsidering the prior art device controller architecture and associated protocols.

Multiple Data Transfers

Network and other file servers, (e.g. UNIX), transfer data twice across the system bus in order to transmit data stored on fixed media to the requesting device. First the data is transmitted from the storage media into system memory through the system bus. Next the data is transmitted through the system bus to the controller or port from which the request originated. From there, the data is transmitted to the requesting device, for example a PC connected on a local area network. The double transfer occurs whether or not direct memory access techniques are employed. Such multiple transfers are inefficient and reduce system throughput.

CPU Local Cache

Heretofore, before a CPU could access program executable images or data files, they were first transferred from storage into the computer's main memory using a mechanism such as Direct Memory Access (DMA). While the DMA occurred, the CPU was typically "asleep" waiting for transfer completion. Once the transfer was completed, a signal such as an interrupt notified the CPU that the program or data was ready. Only after the interrupt signal arrived could the CPU access the information or program image.

In the case of an executable image, the CPU would typically load the first part of the image into its local program cache and then execute out of program cache memory. The computer system would typically attempt to "stay ahead" of the CPU by loading the cache with some form of look-ahead algorithm. A similar construct was used for the CPU data cache. While CPU local cache memory is helpful, a need to improve mass storage access remains.

Prior Art Attempts to Improve Storage Access Speed

1. The "RAM Disk" or "RAM Drive"

Heretofore, access to data at CPU local bus speeds has been limited to segments of computer system memory addressed by an operating system dependent software device driver so as to emulate a disk drive. One of the problems with this solution is the size of the emulated disk drive (or "RAM drive"). The RAM drive is constructed from system memory, so it subtracts from available system resources and cannot exceed a fraction of total system memory size. Another problem is that a RAM drive must be loaded each time that the system is powered on.

RAM drives also are unable to correct any detected errors. In fact, under MS-DOS™, a RAM disk data error generates a parity error signal that will completely halt the machine with complete loss of all non-saved data. No RAM drive can operate as a bus master.

Battery backed-up system bus resident expansion memory RAM drives solve the power-on load problem as long as the computer is continuously powered or is turned off for less time than is provided by the battery backup. Even so, battery backed-up expansion memory RAM drives still require an operating system software device driver with its attendant overhead to operate and reside on the computer's system bus with all its attendant delays (described above).

2. Disk Drives

Disk drives comprise spinning media with mechanical arms that move a read/write head over the spinning media. The concept is similar in nature to a record player with the ability to pick the track to begin playing. However, a data file will typically occupy many tracks and requires many accesses. Every time that a new track is accessed, the mechanical arms must move. This operation is called a seek. The mechanical delays further exacerbate the problem of rapid data access. Mechanical disk drives, therefore, are part of the problem rather than the solution.

3. Semiconductor Disk

Semiconductor disks (SCD) are solid-state memory products that are used to emulate a mechanical disk drive. The advantage of an SCD is elimination of mechanical delays, thus providing a very fast access time to data. Many of these devices have error correction circuitry (ECC). Only very expensive models offer data scrubbing, wherein stored data is checked for errors on a continual basis and any correctable errors fixed. All SCD devices use a high-level protocol, such as SCSI, for a communications interface. Therefore, they are subject to both high and low-level protocol delays.

A typical SCD will have an access time of approximately 350 Microseconds. The fastest of these devices offer data access in approximately 125 Microseconds. This is how long the drive takes to start to provide information to the first protocol interface. Once the data has traversed the first protocol level, the data must then pass through the additional system bus protocol interface to get to system memory. So while SCD offers a fast storage medium, it does nothing to relieve the existing protocol "bottleneck" between the CPU and the storage medium.

4. Disk Caching

Another attempt to address the high-speed data access problem is disk caching. Caching technology is cumbersome and has a tremendous overhead. In caching technology, an attempt is made to keep the data most likely to be requested in high speed memory. Unfortunately, this has no benefit when accessed files exceed the size of the cache buffer. Some benefit is realized when small data segments are accessed repeatedly, but the overhead of tracking which data elements should be retained in cache memory and which swapped out reduces some of the gains realized. Moreover, disk caching devices reside on the computer system bus with all its attendant delays. Recall that the system bus is isolated from the CPU as described above with regard to FIG. 1.

SUMMARY OF THE INVENTION

In view of the foregoing background, one object of the invention is to provide high-speed access to mass memory in a computer system.

Another object of the invention is to provide high-speed access to continuously error corrected computer storage.

Another object is to provide a fixed storage mechanism that eliminates high-level protocols and the attendant time delays, and minimizes low level protocols, to improve data access speeds.

A further object is to provide a solid-state data storage media offering data access within no more than a few microseconds.

Yet another object is to bypass conventional high-level protocol controller hardware and low-level system bus interface hardware.

A further object is to continuously supply data to or read data from the CPU local bus at the bus's maximum data transfer rate.

Still another object of the invention is to provide continuously error corrected primary or secondary mass storage in a computer system.

Substantial improvements in computer system performance can be achieved by alleviating the "bottleneck" in existing mass storage access methods and apparatus. Toward that end, I have reconsidered the known architectures, protocols and methods summarized above. One aspect of the present invention is a novel mass storage system. By "mass storage system" I mean a new combination of hardware and software that provides fast mass storage access in a computer system and other advantages to be described herein.

One aspect of the invention is a mass storage system having an address on the CPU's own local bus. This has the advantage of eliminating the computer system bus interface protocols and delays, as well as the high and low-level protocols conventionally implemented in a storage device controller. Higher data throughput may be realized. To date, the use of the CPU's local bus has been limited to system memory, mathematics co-processors, special high-speed graphical display controller devices and disk drive controllers. Known data storage controller devices like mechanical or solid-state disk drive controllers, memory expansion products and network adapters all reside on the system bus and therefore suffer from protocol overheads.

My mass storage system invention may be implemented as a hardware device that preferably resides electrically on the computer system CPU local bus (but may also reside on the system bus). The mass storage system performs certain logical operations, preferably implemented in one or more solid state devices, so that it provides an interface to an array of "private memory" in such a manner as to embed error correction codes within the stored data, provide error correction of detected errors (data scrubbing), and provide very rapid access to the stored data.

In a preferred embodiment, the invention comprises a high-speed, variable-length packet, continuously error-corrected mass storage system. The mass storage system includes a private, preferably solid state memory, a portion of which is used for interleaved error correction code data. The private memory also is used to store system file and other data. The private memory is not directly accessible to the computer CPU local bus, system bus nor any device controller.

The mass storage system also includes a "CPU local bus interface". The CPU local bus interface includes registers directly accessible to the computer CPU local bus. The CPU local bus interface also includes a plurality of large data input/output buffers, operated in parallel to optimize bus utilization and to provide decoupling, thereby allowing bus and internal (mass storage system) transfers to be accomplished independently and at maximum band width.

Other features of the mass storage system are means for checking data transmitted to the bus for errors during transmission, means for repairing detected errors during data transmission, and means for generating error codes from received data during reception. The mass storage system also includes means for adding generated error codes to received data during reception, thereby forming a "data paragraph" with ECC interleaved into the data. Logic (circuitry or firmware) is provided for continuously checking data and error codes stored in the private memory to determine if a memory error has occurred. Means are provided for repairing such detected memory errors found in the private memory. The mass storage system further includes means for transmitting or receiving fixed or variable length data packets, and means for providing an optimized interface to the computer bus.

As data moves into the mass storage system, Error Correction Codes (ECC) are generated by the ECC circuitry in 154. Standard hamming codes may be used. In the preferred embodiment, the mass storage system uses 8 bits of memory for ECC bits for every 64 bits of data to be stored, thereby forming an internal data paragraph of 72 bits. The internal paragraph thus consists of 8 bytes of data and 1 byte of ECC, interleaved as illustrated in FIG. 6.

For data residing in the mass storage system memory, ECC codes are constantly checked against the represented data by an embedded processor. All one-bit errors found are corrected (data scrubbing). Similar memory constructs enjoy a Mean Time Between Failures (MTBF) of approximately 12,000 years.

The mass storage system employs modified Hamming codes for error detection and correction. As data move out of the mass storage system, the ECC codes are again checked against the data. Detected one-bit errors are corrected. In the unlikely and nearly impossible event of a two-bit error, the error is reported in a fashion consistent with that expected by the computer system. Data scrubbing is discussed further below.

The mass storage system illustrated can maintain system burst speeds for as long as the computer system can sustain them. This is accomplished using data pipelining with a plurality of input/output buffers. As each data word is written from the error correction circuitry to the output buffer, a new data word is taking its place in the error detection circuitry.

Within the error detection circuitry, each data word moves sequentially, one after another with no wait time between the data words. Upon exiting the error detection circuitry, the data is written into one of a plurality of buffers. While the bus is reading from or writing to one of the input/output buffers, the mass storage system is writing to or reading from another one of the buffers. The buffers thus operate in parallel. Data is constantly moving through the logic circuitry of the mass storage system and its input/output buffers such that throughput to the bus is maximized. As the CPU clock speeds increase, the mass storage system clock rate increases as well, so that the mass storage system data transfer rate always exceeds the local bus rate and thus keeps the bus swamped.

The mass storage system can provide fixed or variable length packets of data either to or from the CPU local bus. If the computer operating system has a fixed buffer length, then it may request or transmit data from or to the Mass Storage System in packets the size of the fixed length buffer. If the operating system provides a variable length buffer, then variable length packets can be received or transmitted, such packets matching the operating system buffer size.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a block diagram illustrating a conventional computer architecture as it pertains to mass data storage access.

FIG. 2 is a block diagram illustrating a new data storage and interface device or "mass storage system" residing on a CPU local bus in accordance with the present invention.

FIG. 3 illustrates the effect of storage unit sector size on utilized versus wasted memory space for an 8-byte (64-bit) internal mass storage system paragraph size.

FIG. 6 illustrates an example of a 72-bit internal "data paragraph" created by the mass storage system of FIG. 5 that includes both data and embedded error correction codes.

FIG. 7A through FIG. 7D illustrate data flow and ECC generation in the mass storage system of FIG. 5 for various private memory word size configurations.

BRIEF DESCRIPTION OF THE TABLES

TABLE 1 lists typical steps of a generic high-level protocol for access through a device controller.

TABLE 2 lists SCSI Read Protocol

TABLE 3 is a summary comparison of a RAM drive emulator to the new Mass Storage System TABLES 4A–4D each illustrate a sequence of steps to execute a Write Operation according to the present invention.

TABLES 5A–5D each illustrate a sequence of steps to execute a Read Operation according to the present invention.

TABLE 6 Lists types of disk file reads for a conventional disk drive.

TABLE 7 Compares Timing factors involved with a file read operation among the present invention and known devices.

TABLE 8 compares typical File Read Timings for known systems to expected values for the new Mass Storage System (Sans Protocols)

TABLE 9 is a tally of various read types involved in a typical 8-MB MS-DOS file read operation.

TABLE 10 lists Device Overhead Times for a typical 8-MB MS-DOS file read operation.

TABLE 11 summarizes Protocol and Software Overhead for a typical 8-MB MS-DOS file read operation.

TABLE 12 compares SCSI drive performance to expected performance of the mass storage system.

TABLE 13 compares expected performance of a 256-MB mass storage system to that of a hypothetical 256-MB RAM disk.

TABLES 14A–14C illustrate sequence and timing of error correction methods for various word sizes.

DETAILED DESCRIPTION OF THE PREFERRED EMBODIMENT

System Overview

Figure 4:
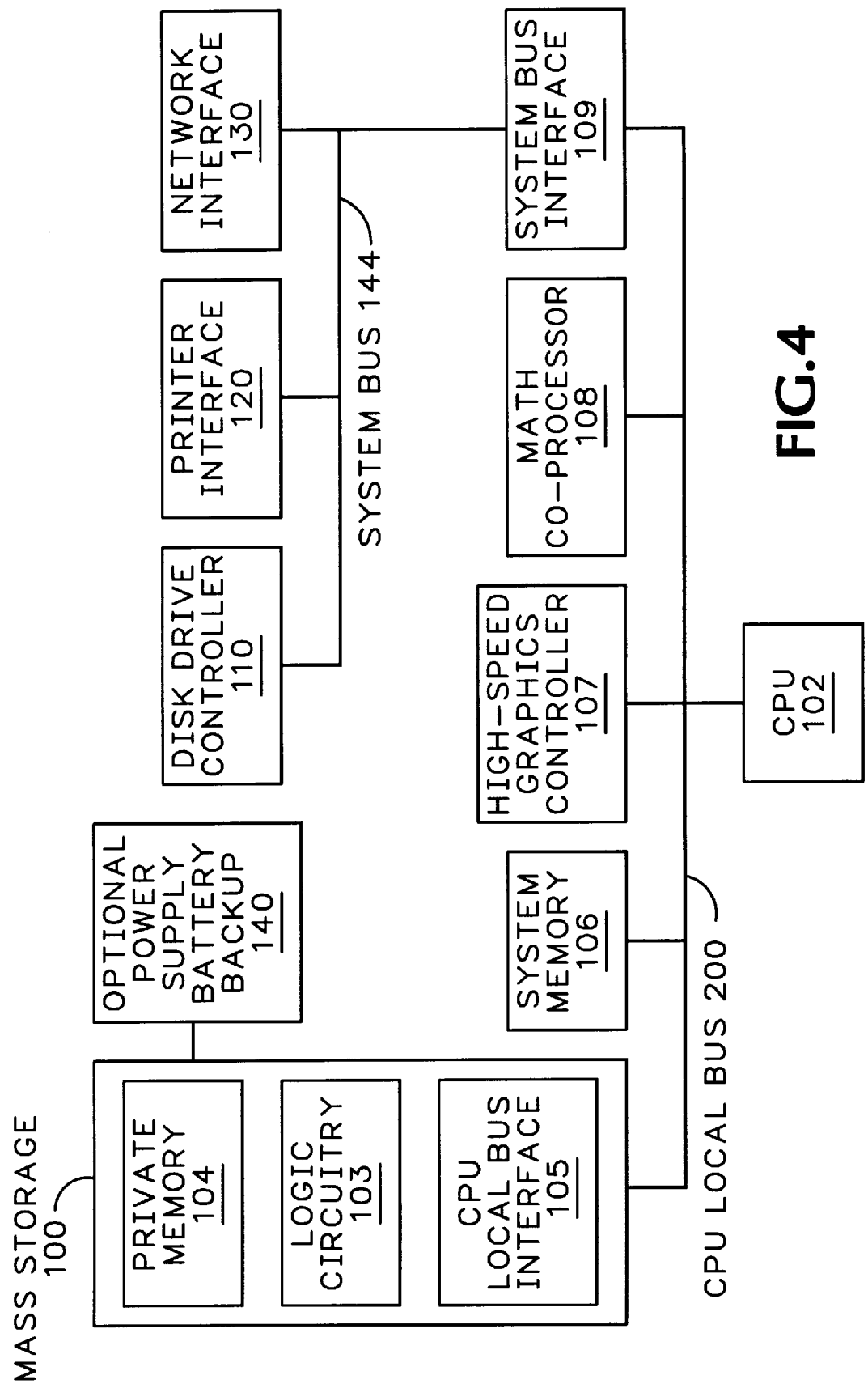
FIG. 4 is a block diagram illustrating implementation of a mass storage system on the CPU local bus in a typical computer system.

FIG. 4 is a block diagram of a computer system illustrating one application of the present invention. A mass storage system 100 resides at a predetermined address on the computer CPU local bus 200. The mass storage system therefore has direct connections to the CPU 102 and any other device residing on the local bus, such as a high-speed graphics controller 107, conventional system memory 106, a mathematics co-processor 108 or the system bus interface 109. In an alternative embodiment, the mass storage system 100 may reside on the system bus 144, but at a penalty in terms of access time and data transfer rates.

A conventional System Bus 144 is connected to the System Bus Interface 109. A Disk Drive controller 110, Printer Interface 120, Network Interface 130, etc. may reside on the System Bus 144, as is known. None of these is essential to practicing the invention, but they are shown to complete the context.

Physically, the mass storage system apparatus may be located on a motherboard, or on a daughter board with direct connections to the CPU local bus through a local bus expansion slot. Other variations are possible depending on the target platform. Preferably, the mass storage system is implemented as a single integrated circuit device.

Mass Storage System 100 includes a Private Memory Array 104, Logic Circuitry 103 and a CPU local bus interface 105. An optional power supply battery backup 140 may be coupled to the mass storage system 100, if necessary, for nonvolatility.

A. Private Memory

The private memory array 104 preferably comprises an array of high-speed, solid-state, random access memory. The array size is arbitrary, and depends upon system application requirements. Total memory size is always implicated in trading off cost versus performance. The private memory word size is flexible, as will appear in the examples below, since various word sizes may be accommodated by staging buffers. The mass storage system internal data path size will generally dictate the private memory word size, although these factors should be balanced against one another to optimize performance. Details of the private memory will be apparent to those skilled in integrated circuit memory design.

B. Logic Circuitry 103 Generally Provides the Following Functions

1. Local Bus Interface
2. Address and Command Decode
3. Error Code Generation
4. Error Detection and Correction
5. Data Scrubbing
6. (Private) Memory Interface each of these functions will be described below in greater detail. The logic circuitry provides access to the private memory array 104, which may require a continuous power supply with battery backup 140 if the private memory array is constructed with volatile memory components (e.g., DRAM).

Figure 5:
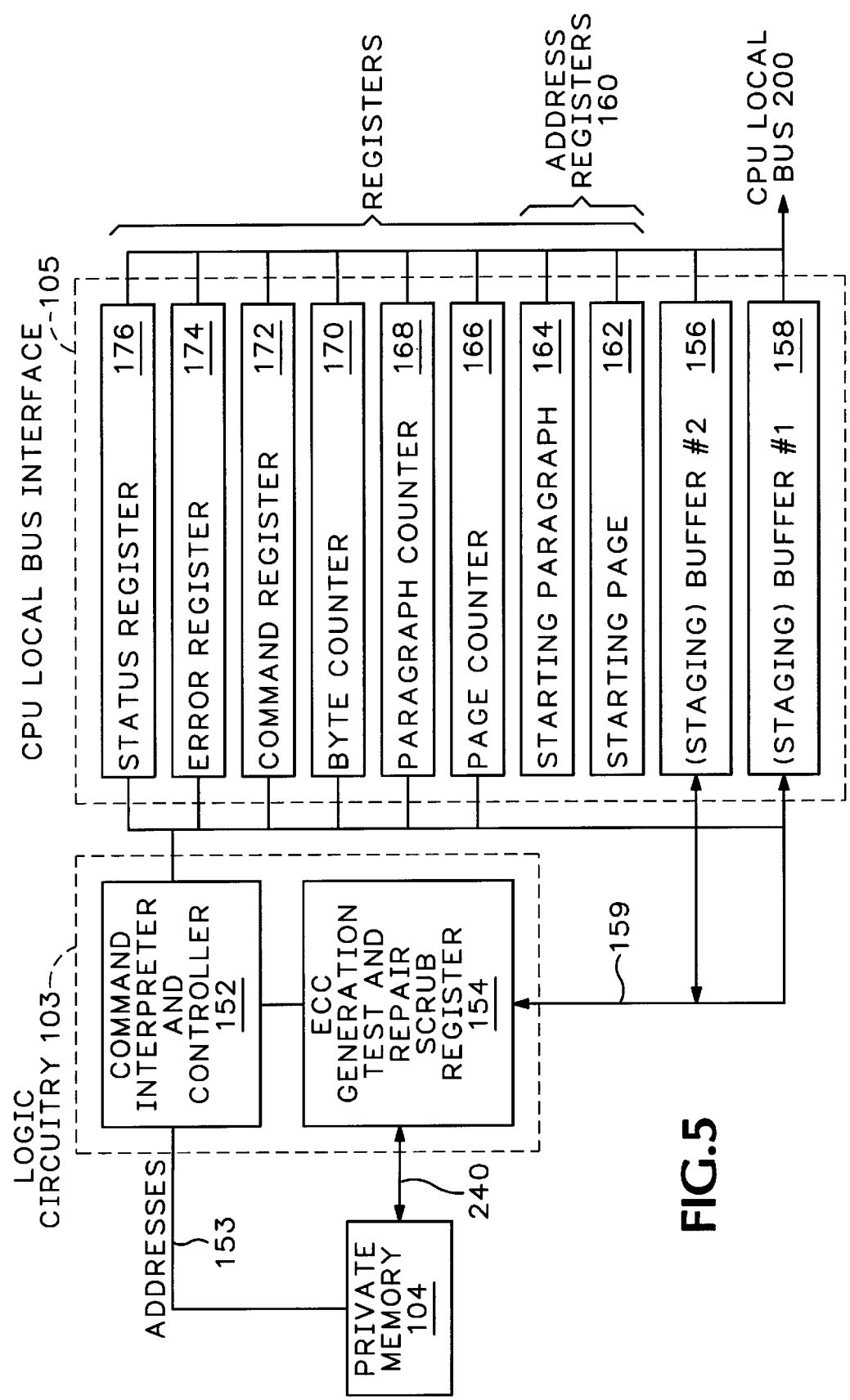
FIG. 5 is a block diagram of the Mass Storage System 100 of FIG. 4.

FIG. 5 is a simplified block diagram showing the mass storage system 100 in greater detail. Private memory 104 is addressed and controlled by a Command Interpreter and Controller 152. Data is routed through ECC Generation, Test and Repair circuitry 154 during write operations and through error code test (154 also) during data scrubbing and read operations.

C. CPU Local Bus Interface

CPU local bus interface 105 comprises two or more buffers, for example staging Buffer #1 (reference 158) and staging Buffer #2 (156). These buffers are used to stage incoming and outgoing information. The CPU local bus interface further includes a series of address registers 160. The address registers may include, for example, a starting page register 162 and a starting paragraph register 164. These registers receive start address information for accessing files stored in the private memory. CPU local bus interface further includes counting registers comprising a page counter 166, a paragraph counter 168 and a byte counter 170 also used in file access operations. Additional registers in the CPU local bus interface include a command register 172, a status register 176 and an error register 174. All of these registers reside on the CPU Local Bus 200 to receive address and data information. CPU local bus interface 105 is coupled to the CPU Local Bus 200.

Write Operations

Referring to FIG. 5, the mass storage system reads data from the buffers 156, 158 in 64-bit paragraphs consisting for example, of four 16-bit words or two 32-bit words, or one 64-bit word, depending upon the computer system (CPU local bus) word size. The internal mass storage system paragraph size is selected to accommodate the system word size plus ECC bits. As the data passes via internal bus 159 through the ECC generation test and repair circuit 154, error codes are generated and interleaved with the data. The combined data is written into the private memory array 104.

More specifically, the mass storage system reads a first word from the CPU bus 200 and begins ECC generation. If the computer system word is smaller in size than the mass storage system paragraph, the word is passed to a staging buffer 156, 158 which is used to collect system words to form a Mass Storage System paragraph. This continues until a data paragraph has been constructed. If the computer system word is the same size as the data paragraph, no staging and construction is required. Once a complete paragraph has been received or constructed, it is passed on to ECC generation circuitry in ECC generation, test and repair circuit 154. As the data paragraph passes through the ECC generation circuitry in ECC generation, test and repair circuit 154, the resultant ECC bits are interleaved into the data paragraph by encoding a ninth bit for each eight bit byte of data, as illustrated in FIG. 6. The resulting combined data paragraph is written to the private memory 104, at an address determined by the address information in the CPU local bus interface 105.

FIG. 6 illustrates the combined data paragraph using the preferred internal format. It shows one error correction bit or code "E" inserted for each eight bits of data "D". For a 64-bit data paragraph, there are eight ECC bits, for a total of 72 bits actually stored in the private memory.

Referring now to FIG. 7A, error code generation and data pipelining are illustrated in greater detail for executing a WRITE command. For illustration purposes, FIG. 7A assumes a 32-bit incoming data word size and 18-bit private memory word size. Incoming data words are labeled A,B,C and D. These incoming 32-bit data words are written into staging buffers 156, 158. Each staging buffer, for example staging buffer 158, comprises a series of four segments, numbered 1–4 in the figure. Staging buffer 156 comprises segments numbered 5–8. Each staging buffer stores 64 bits of data (plus room for 8 bits of error correction codes during read operations, explained later).

Each staging buffer segment (1–8) includes bytes "a" and "b" which may be addressed as 8 bits wide, for ECC generation or write operations, or as 9 bits wide, (i.e. data plus ECC) for read operations. As illustrated in FIG. 7A, the staging buffers are coupled via a bus 240 to the private memory array 104. Staging buffer 158 also is coupled to ECC generation logic 230. The ECC logic 230 generates an ECC bit for each buffer segment, i.e. for each 8-bit unit of input data. Similarly, staging buffer 156 is coupled to ECC generation logic 232.

Figure 8:
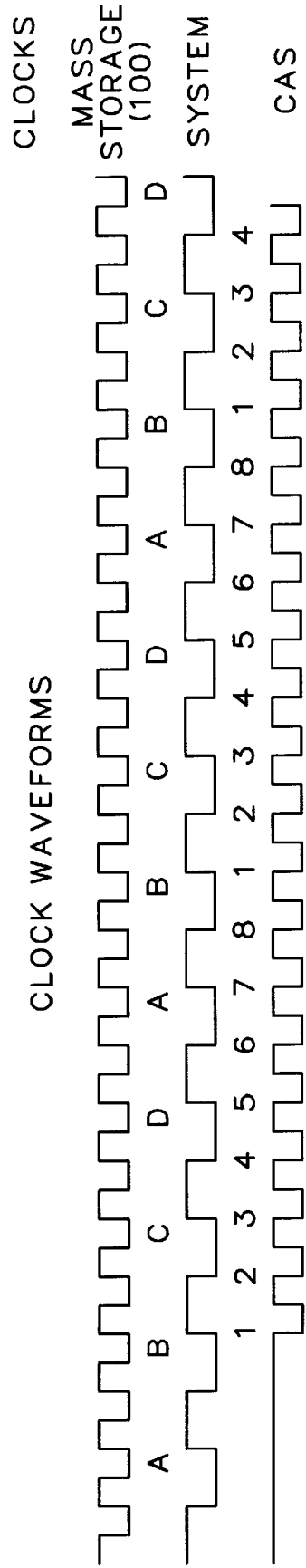
FIG. 8 is a timing diagram showing the relationship among a mass storage system clock signal, system clock signal and CAS (Column Address Strobe) memory clock signal in a write operation of a system of the type illustrated in FIG. 4.

Eight ECC bits corresponding to eight contiguous bytes of input data are combined to produce an ECC byte. After the ECC generation circuitry 230 generates the ECC bits, the contents of staging buffer 158 (addressed as four 16-bit segments) are written sequentially to the private memory array. A corresponding two of the ECC bits are interleaved along with each 16 bits of data, thus forming an 18-bit by 4 data paragraph. This process and pipeline timing for four incoming 32-bit words are illustrated in Table 4A. Referring to Table 4A, it may be seen that, in this example, the mass storage system clock runs at twice the speed of the system clock. The clock waveforms are illustrated in FIG. 8.

TABLE 4A

Write Operation (See FIG. 7A)

| Mass Storage System Clock | System Clock | Action |
|---|---|---|
| 1. | | |
| 2. | 1 | Incoming word A is written to staging buffer segments 1 and 2. |
| 3. | | |
| 4. | 2 | Incoming word B is written to staging buffer segments 3 and 4. |

TABLE 4A-continued

Write Operation (See FIG. 7A)

| Mass Storage System Clock | System Clock | Action |
|---|---|---|
| 5. | | Error codes are generated for incoming words A and B. |
| 6. | 3 | Incoming word C is written to staging buffer segments 5 and 6. Staging buffer segment 1 and corresponding ECC bits are written to private memory. |
| 7. | | Staging buffer segment 2 and corresponding ECC bits are written to private memory. |
| 8. | 4 | Incoming word D is written to staging buffer segments 7 and 8. Staging buffer segment 3 and corresponding ECC bits are written to private memory |
| 9. | | Error codes are generated for incoming words C and D. Staging buffer segment 4 and corresponding ECC bits are written to private memory. |
| 10. | 5 | Staging buffer segment 5 and corresponding ECC bits are written to private memory. Next incoming word written to staging buffer segments 1 and 2 |
| 11. | | Staging buffer segment 6 and corresponding ECC bits are written to private memory. |
| 12. | 6 | Staging buffer segment 7 and corresponding ECC bits are written to private memory. Next incoming word written to staging buffer segments 3 and 4 |
| 13. | | Staging buffer segment 8 and corresponding ECC bits are written to private memory. |

Figure 7B:
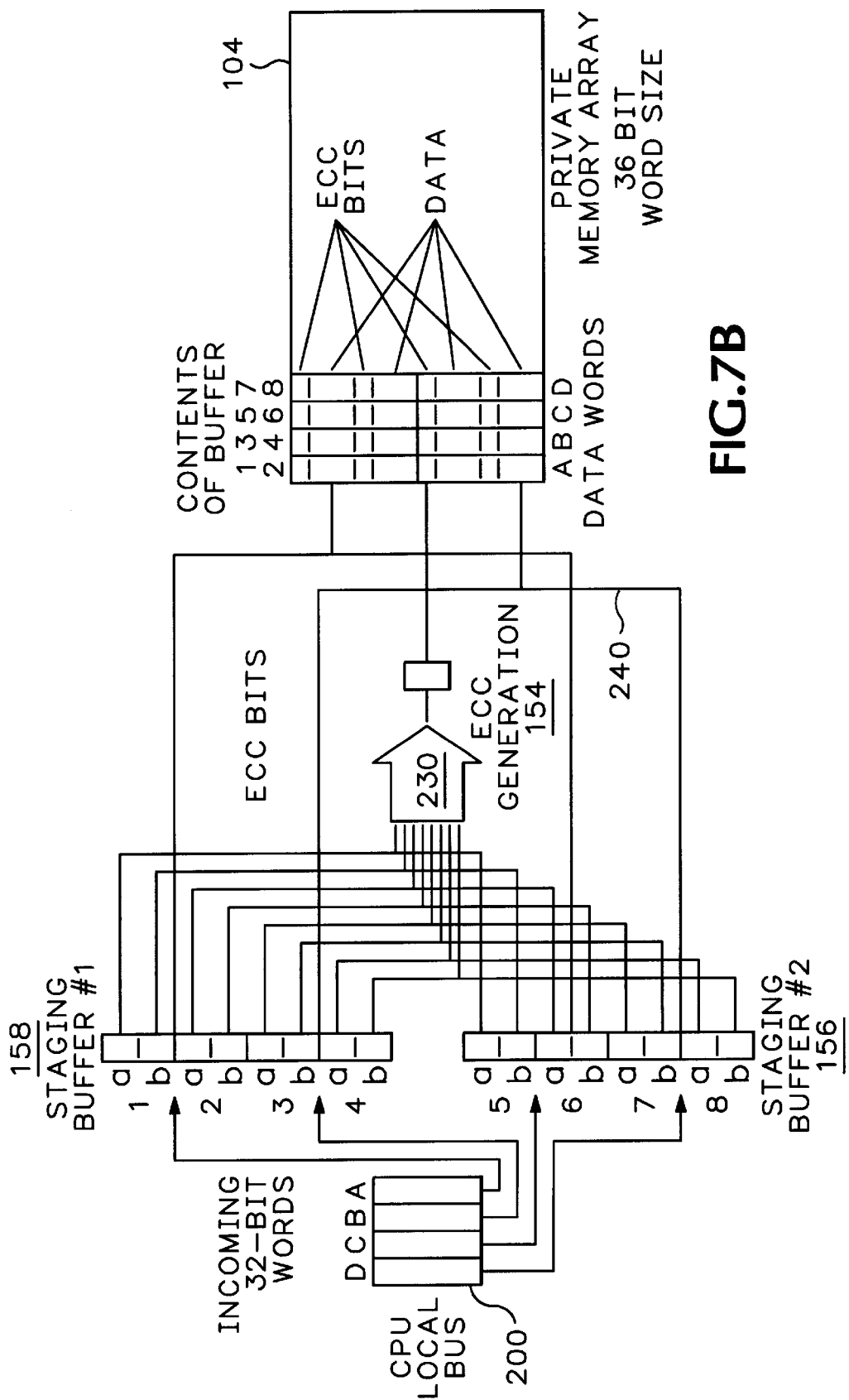

FIG. 7B illustrates an alternative embodiment error code generation and data pipelining for executing a Write command. In this illustration, the incoming data words are assumed to be 32-bits and the private memory array 104 has a 36-bit word size. This arrangement allows for a one-to-one correspondence between the incoming data words and the corresponding words stored in the private memory array, the latter including interleaved ECC bits. In the apparatus of FIG. 7B, a single ECC generator 230 is coupled to receive input data from both staging buffers 158,156. As before, the first incoming word "A" is written to segments 1 and 2 of staging buffer 158. On the next system clock cycle, a second incoming word B is written to segments 3 and 4 of staging buffer 158. The timing proceeds as detailed in the following table 4B:

TABLE 4B

Write Operation (See FIG. 7B)

| Mass Storage System Clock | System Clock | Action |
|---|---|---|
| 1. | | |
| 2. | 1 | Incoming word A is written to staging buffer segments 1 and 2. |
| 3. | | |
| 4. | 2 | Incoming word B is written to staging buffer segments 3 and 4 |
| 5. | | Error codes are generated for incoming words A and B |
| 6. | 3 | Incoming word C is written to staging buffer segments 5 and 6 Staging buffer segments 1 and 2 and corresponding ECC bits are written to private memory |

TABLE 4B-continued

Write Operation (See FIG. 7B)

| Mass Storage System Clock | System Clock | Action |
|---|---|---|
| 7. | | Staging buffer segments 3 and 4 and corresponding ECC bits are written to private memory |
| 8. | 4 | Incoming word D is written to staging buffer segments 7 and 8 |
| 9. | | Error codes are generated for incoming words C and D |
| 10. | 5 | Staging buffer segments 5 and 6 and corresponding ECC bits are written to private memory Next incoming word written to staging buffer segments 1 and 2 |
| 11. | | Staging buffer segments 7 and 8 and corresponding ECC bits are written to private memory |
| 12. | 6 | Next incoming word written to staging buffer segments 3 and 4 |

In operation of the circuits of FIGS. 7A and 7B, as detailed in Tables 4A and 4B, respectively, it may be observed that the Mass Storage System clock operates at twice the system clock frequency. By use of the pair of staging buffers 158, 156 and generation of error code bits for two data words at a time, the host system computer can write data to the Mass Storage System at its maximum clock rate, i.e., one data word per system clock cycle. Thus, there is no protocol delay or overhead associated with a write operation to the Mass Storage system.

Figure 7C:
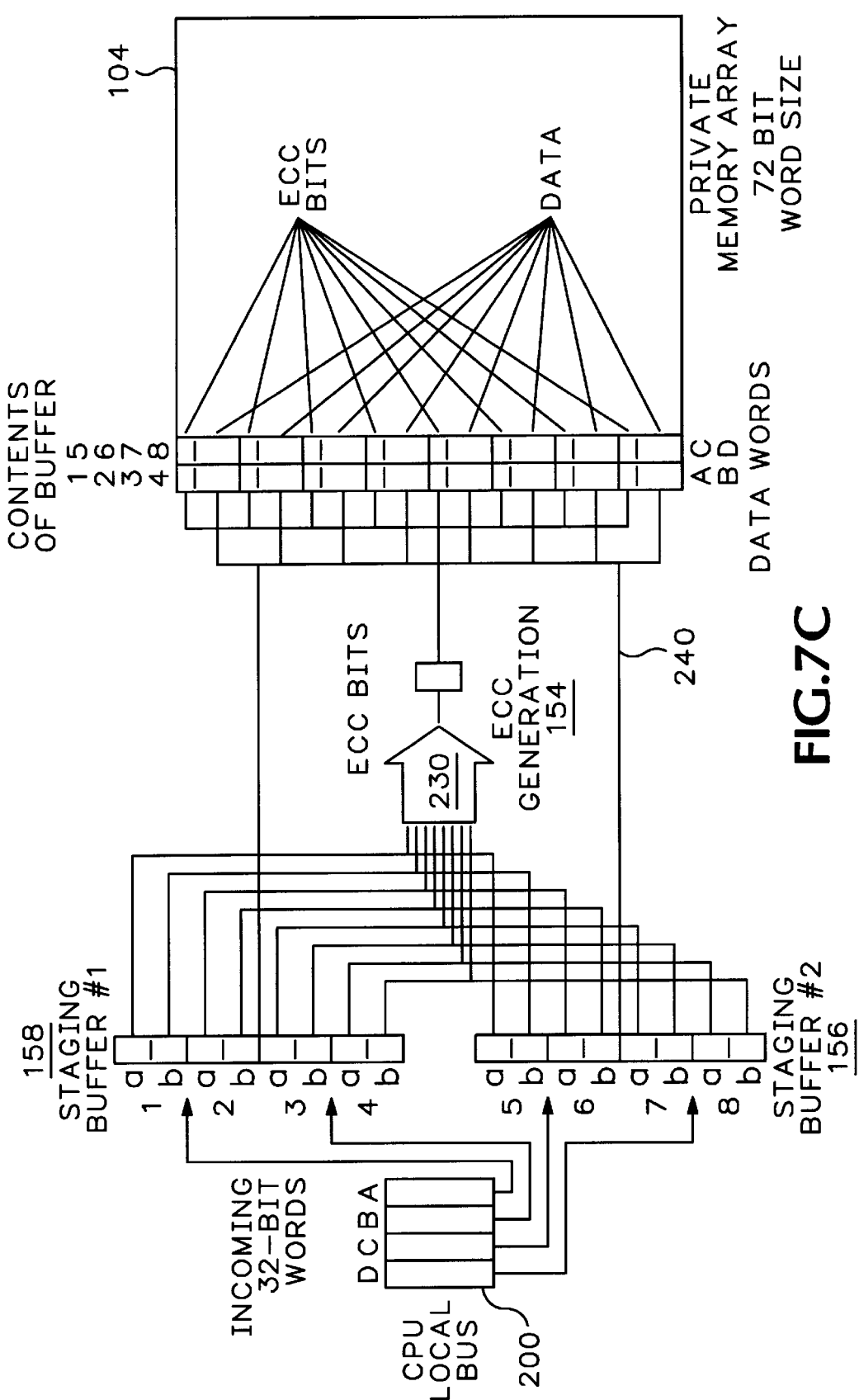

The number of staging buffers and their size, the arrangement of the private memory array and the pipeline timing may of course be varied to accommodate any desired system word size, to achieve the same goal. For example, FIG. 7C illustrates a system that incorporates a 72-bit word size in the private memory array. The operation is similar to that illustrated above with respect to FIG. 7B, except that the larger private memory word size allows the context of an entire staging buffer (four segments) to be written into the private memory in a single Mass Storage system clock cycle (along with ECC bits). Operation of the circuit of FIG. 4C is illustrated in the following table 4C:

TABLE 4C

Write Operation (See FIG. 7C)

| Mass Storage System Clock | System Clock | Action |
|---|---|---|
| 1. | | |
| 2. | 1 | Incoming word A is written to staging buffers segments 1 and 2. |
| 3. | | |
| 4. | 2 | Incoming word B is written to staging buffers segments 3 and 4. |
| 5. | | Error codes are generated for incoming words A and B. |
| 6. | 3 | Incoming word C is written to staging buffers segments 5 and 6. Staging buffer segment 1 and corresponding ECC bits are written to private memory |
| 7. | | |
| 8. | 4 | Incoming word D is written to staging buffers segments 7 and 8. |
| 9. | | Error codes are generated for incoming words C and D. |

TABLE 4C-continued

Write Operation (See FIG. 7C)

| Mass Storage System Clock | System Clock | Action |
|---|---|---|
| 10. | 5 | Staging buffer segment 2 and corresponding ECC bits are written to private memory. Next incoming word written to staging buffers 1 and 2. |
| 11. | | |
| 12. | 6 | Next incoming word written to staging buffers 3 and 4. |

Figure 7D:
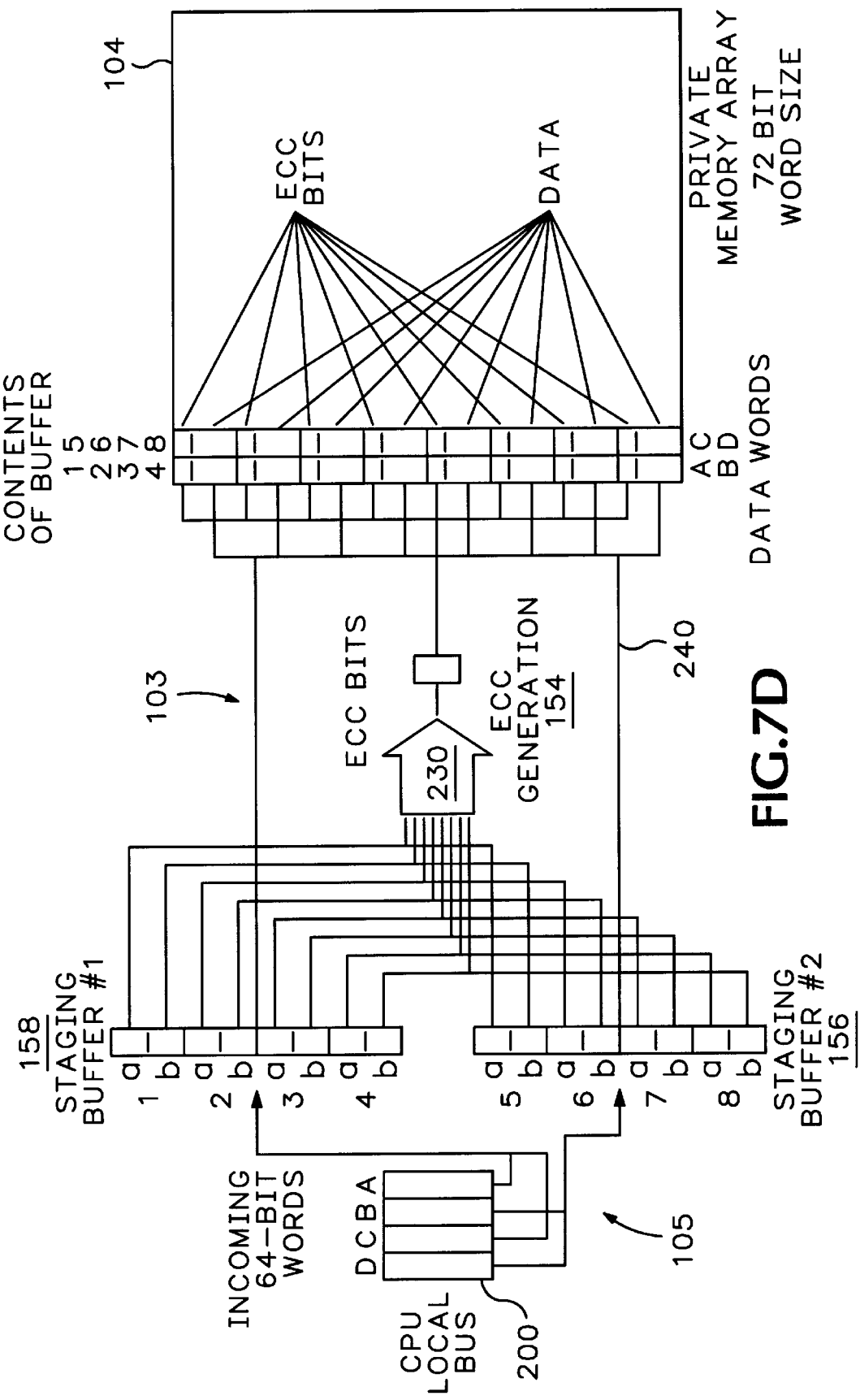

FIG. 7D illustrates write command data flow and ECC generation in the mass storage system of FIG. 5 for a 64-bit system word size and 72-bit private memory word size. Execution of the write command proceeds in this context as shown in the following table:

TABLE 4D

Write Operation (See FIG. 7D)

| Mass Storage System Clock | System Clock | Action |
|---|---|---|
| 1. | | |
| 2. | 1 | Incoming word A is written to staging buffer 1 |
| 3. | | ECC codes are generated for staging buffer 1 |
| 4. | 2 | Incoming word B is written to staging buffer 2 Staging buffer 1 written to private memory |
| 5. | | ECC codes are generated for staging buffer 2 |
| 6. | 3 | Incoming word C written to staging buffer 1 Staging buffer 2 written to private memory |
| 7. | | ECC codes are generated to staging buffer 1 |
| 8. | 4 | Incoming word D written to staging buffers 2 Staging buffer 1 written to private memory |

In this case, the private memory word size equals the system (or data) word size, plus the ECC bits. Accordingly, the write operation moves whole words at a time. The mass storage system internal clock runs at twice the system clock speed, the intervening clock cycles allowing for ECC generation.

Read Operations and Error Checking

By a Read command, the computer system requests one or more paragraphs of data stored in the private memory array 104. The CPU sends a Read command to the command register 172, where it is fetched and decoded by a Command Interpreter and Controller 152. The desired starting page, starting paragraph, number of paragraphs, etc of the read command are written to the appropriate registers 162, 164, 168, etc of the CPU local bus interface 105. From this information, the mass storage system Command Interpreter and Controller (or simply "Controller") logic 152 computes the total volume of data to be transmitted and its actual starting address in the private memory. Address info is provided to the private memory 104 over address bus 153. The Mass Storage system then forms one or more data packets to be transmitted to the CPU local bus in the manner prescribed for such a read request by the computer system.

Once the data start address and the length are determined, the mass storage system starts to pipeline the data. The mass storage system reads the requested data from private memory 104 one data paragraph at a time. Recall the data is stored in the internal data format of FIG. 6. As each paragraph passes through the generation, test and repair circuitry 154, the ECC bits are stripped off while the remaining data passes through ECC generation circuitry on its way to being written to one of staging buffers 156 and 158. An output buffer is used if the system word size is less than the internal mass storage system paragraph size (64 bits). Otherwise, the data may be written to the CPU local bus 200 in whole words without staging.

While the data paragraph is written to the output data buffer or bus, the stripped ECC is checked against the generated ECC. If an error has been detected and buffers are in use, the detected error will be corrected prior to data transmission. If an error has been detected and all writes are directly to the bus, an error will be reported and re-transmission will occur.

Figure 9A:
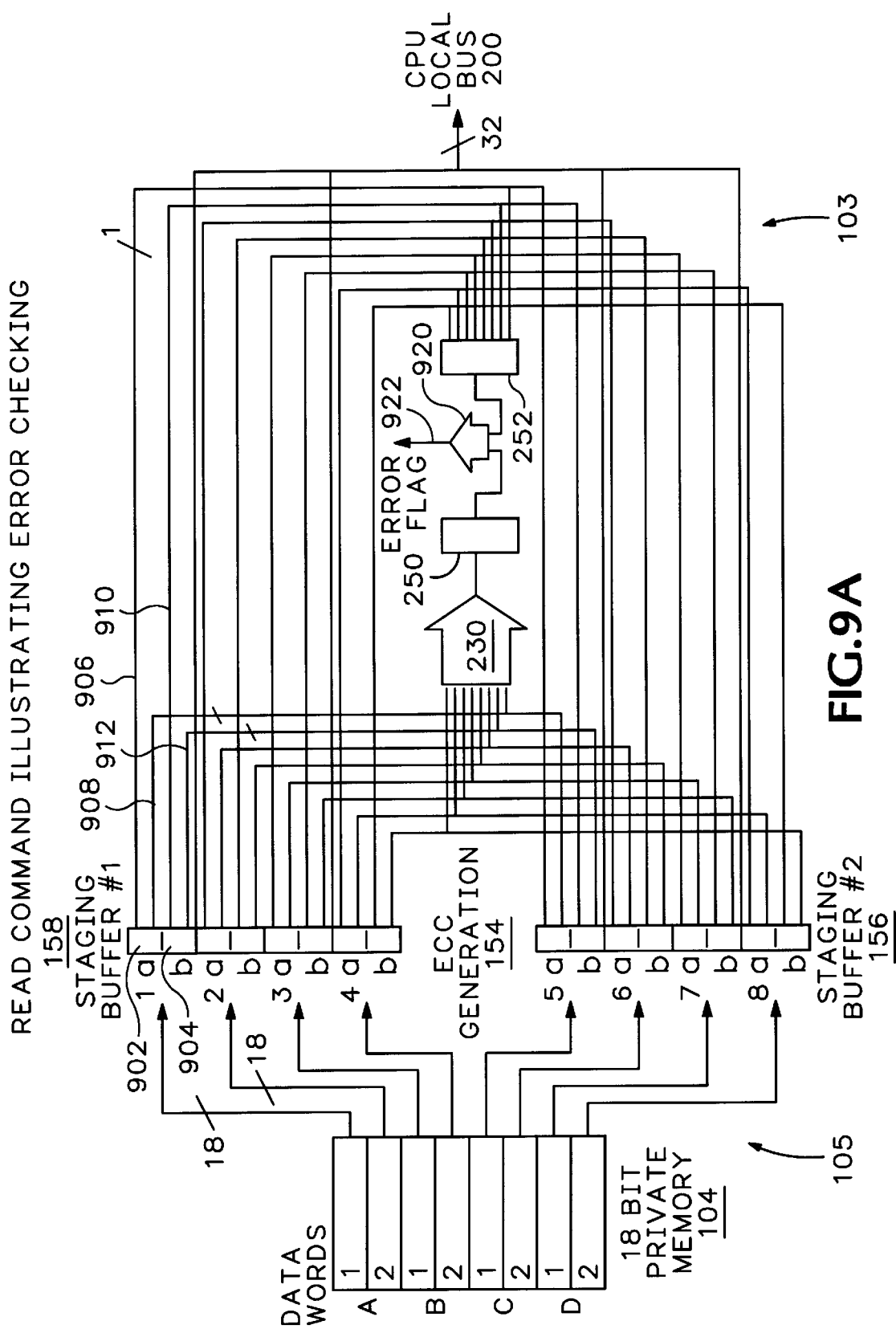
FIG. 9A through FIG. 9D illustrate execution of a Read command and error checking in the Mass Storage System of FIG. 5 for various private memory word sizes.

Refer to FIG. 9A, in which a Read operation is illustrated. In this example, private memory word size is 18-bit, and CPU bus (system word size) is 32-bit (the same configuration as FIG. 7A). Recall that the data is stored internally as four 18-bit words (including interleaved ECC bits). Put another way, each output data word (i.e. 32-bit system word size) occupies two 18-bit addresses in private memory. The first four stored data words to be read are labeled A1, A2, B1 and B2. The private memory is written to the staging buffers (segments 1–4). Thus, stored word A1 is copied to Staging Buffer 1 bytes 1a and 1b, while stored word A2 is copied to Staging Buffer 1 bytes 2a and 2b, each byte having nine bits. When 72 bits have been written, the (eight) ECC bits are stripped off to recover the stored ECC byte, 252. For example, referring to the first byte 902 in buffer 1a, the first bit, which is the ECC bit, is provided over path 906 to form a first bit of the recovered ECC byte 252. Similarly, the first bit of byte 904 is provided over path 910 to form a second bit of the recovered ECC byte 252. The 64 bits of data are passed through the ECC generator 230. Thus, eight data bits from byte 902 are provided over path 908 to the ECC generator 230. Similarly, eight data bits from byte 902 are provided over path 912 to the ECC generator 230, and so on in like fashion for data words A2, B1, B2. The resulting ECC byte 250 is compared, for example using an exclusive- or logic 920, to the stored ECC byte 252. Any error, i.e. if the two ECC bytes 230, 252 are not the same, is reported the error flag 922. If no error has occurred, the staging buffer data is written 32 bits at a time to the local CPU bus 200. Table 5 shows the specific steps for each clock cycle during the read operation.

TABLE 5A

Read Operation (See FIG. 9A)
32-bit bus, 28-bit Private Memory

| Mass Storage System Clock | System Clock | Action |
|---|---|---|
| 1. | | Outgoing word A1 is written to staging buffer segment 1, ECC bits stripped |
| 2. | 1 | Outgoing word A2 is written to staging buffer segment 2, ECC bits stripped |
| 3. | | Outgoing word B1 is written to staging buffer segment 3, ECC bits stripped |
| 4. | 2 | Outgoing word B2 is written to staging buffer segment 4, ECC bits stripped |
| 5. | | Staging buffer 1 ECC generated and compared with stripped bits Outgoing word C1 is written to staging buffer segment 5, ECC bits stripped |

TABLE 5A-continued

Read Operation (See FIG. 9A)
32-bit bus, 28-bit Private Memory

| Mass Storage System Clock | System Clock | Action |
|---|---|---|
| 6. | 3 | Outgoing word C2 is written to staging buffer segment 6, ECC bits stripped<br>Staging buffer segments 1 and 2 are written to the bus |
| 7. | | Outgoing word D1 is written to staging buffer segment 7, ECC bits stripped |
| 8. | 4 | Outgoing word D2 is written to staging buffer segment 8, ECC bits stripped<br>Staging buffer segments 3 and 4 are written to the bus |
| 9. | | Staging buffer 2 ECC generated and compared to stripped bits<br>Next outgoing word written to staging buffer segment 1, ECC bits stripped |
| 10. | 5 | Staging buffer segments 5 and 6 are written to the bus<br>Next outgoing word written to staging buffer segment 2, ECC bits stripped |
| 11. | | Next outgoing word written to staging buffer segment 3, ECC bits stripped |
| 12. | 6 | Staging buffer segments 7 and 8 are written to the bus<br>Next outgoing word written to staging buffer segment 4, ECC bits stripped |

Figure 10:
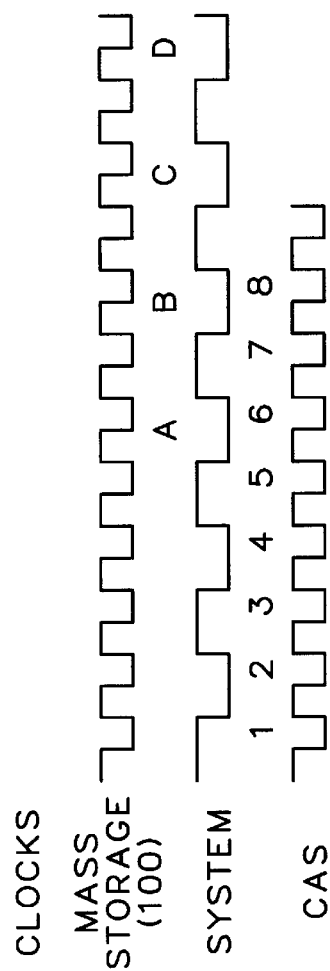
FIG. 10 is a timing diagram illustrating a Read operation.

Initially, the system waits for 2 clock cycles, and then begins to receive one word per clock cycle. The clock waveforms are illustrated in FIG. 10.

Figure 11:
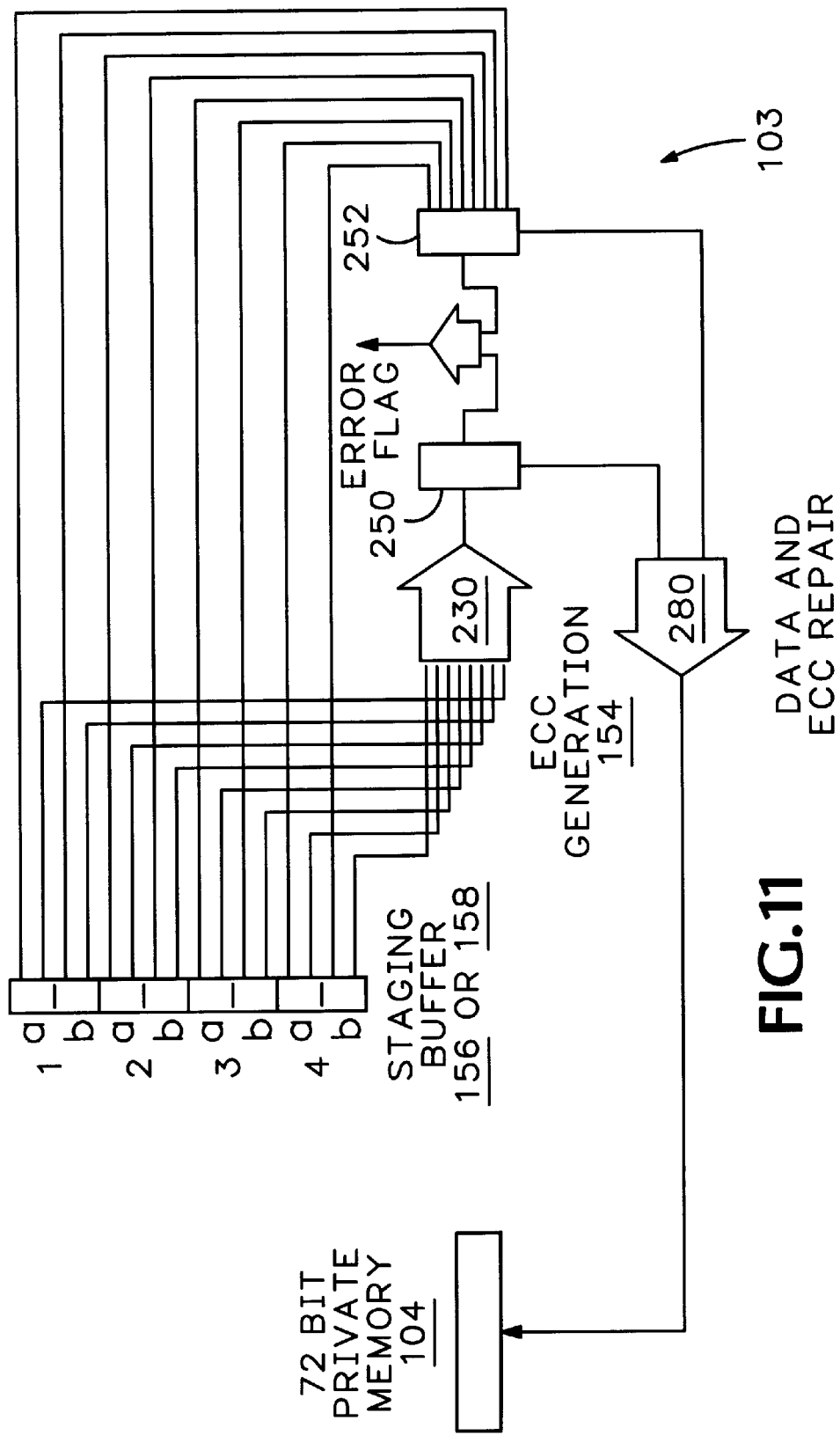
FIG. 11 illustrates error correction in the mass storage system of FIG. 5.

In the rare case of a data error, the contents of the staging buffers are held while the controller (152) computes the error and corrects it. Errors are corrected by repairing the data stored in private memory which is then retested prior to transmission. Data repair is illustrated in FIG. 11 for a 72-bit private memory word size. Repeating errors indicate hardware failure of the memory circuitry and the user is notified which elements needs to be replaced. Once the error has been repaired, normal operation resumes.

Note that the mass storage system employs a plurality of data staging buffers operable in parallel to optimize bus operation and interaction. The mass storage system will fill or empty one data buffer while the computer system reads or writes another data buffer, respectively. These two actions occur simultaneously as illustrated in tables 4A, 4B, 5A and 5B so that bus overhead and wait times are minimized.

Figure 9B:
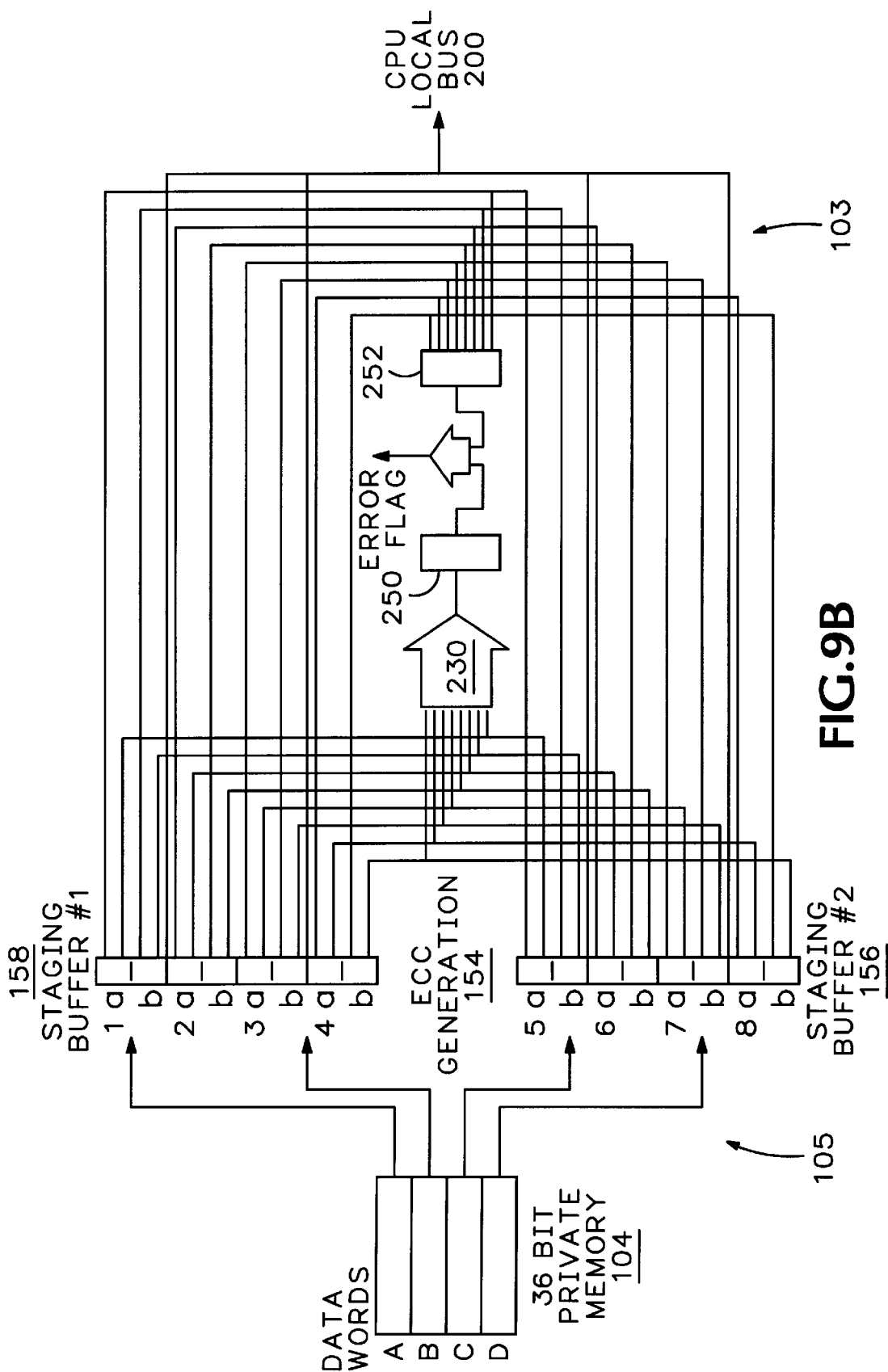

FIG. 9B illustrates a read operation and error checking in a mass storage system apparatus having a 36-bit private memory word size, coupled to a 32-bit local CPU bus. Timing and sequence of the read operation are shown in the following table:

TABLE 5B

Read Operation (see FIG. 9B)
32-bit bus, 36-bit Private Memory

| Mass Storage System Clock | System Clock | Action |
|---|---|---|
| 1. | | Outgoing word A written to staging buffer segments 1 and 2, ECC stripped |
| 2. | 1 | Outgoing word B written to staging buffer segments 3 and 4, ECC stripped |
| 3. | | Staging buffer 1 ECC generated and compared |

TABLE 5B-continued

Read Operation (see FIG. 9B)
32-bit bus, 36-bit Private Memory

| Mass Storage System Clock | System Clock | Action |
|---|---|---|
| 4. | 2 | Outgoing word C written to staging buffer segments 5 and 6, ECC stripped<br>Staging buffer segments 1 and 2 written to bus |
| 5. | | Outgoing word D written to staging buffer segments 6 and 7, ECC stripped |
| 6. | 3 | Staging buffer 2 ECC generated and compared<br>Staging buffer segments 3 and 4 are written to the bus |
| 7. | | Outgoing word E written to staging buffer segments 1 and 2, ECC stripped |
| 8. | 4 | Outgoing word F written to staging buffer segments 3 and 4, ECC stripped<br>Staging buffer segments 5 and 6 are written to the bus |
| 9. | | Staging buffer 1 ECC generated and compared to stripped bits |
| Etc. | | |

In the above example, the computer system waits for 1 clock cycle, then begins to receive one word per system clock cycle. It thus reads data at its maximum bandwidth.

Figure 9C:
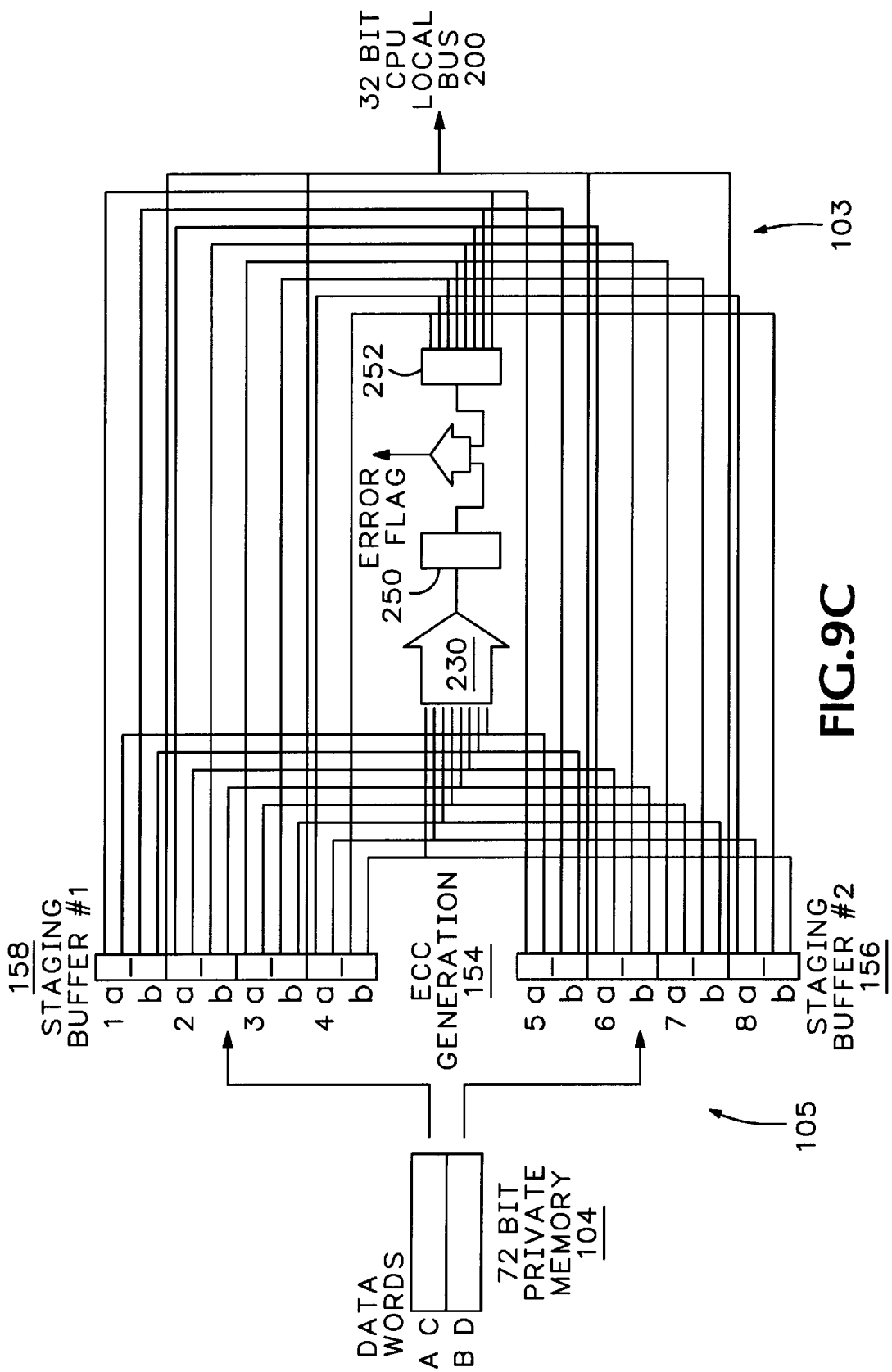

FIG. 9C illustrates a read operation and error checking in a mass storage system apparatus having a 72-bit private memory word size, again coupled to a 32-bit local CPU bus. Timing and sequence of the read operation are shown in the following table:

TABLE 5C

Read Operation (See FIG. 9C)
32-bit bus, 72-bit Private Memory

| Mass Storage System Clock | System Clock | Action |
|---|---|---|
| 1. | | Outgoing word A written to staging buffer 1, ECC stripped |
| 2. | 1 | Staging buffer 1 ECC generated and compared to stripped bits |
| 3. | | Idle |
| 4. | 2 | Outgoing word B written to staging buffer 2, ECC stripped<br>Staging buffer segments 1 and 2 written to the bus |
| 5. | | Staging buffer 2 ECC generated and compared to stripped bits |
| 6. | 3 | Staging buffer segments 3 and 4 written to the bus |
| 7. | | Idle |
| 8. | 4 | Outgoing word C written to staging buffer 1, ECC stripped<br>Staging buffer segments 5 and 6 are written to the bus |
| 9. | | Staging buffer 1 ECC generated and compared to stripped bits |
| 10. | 5 | Staging buffer segments 7 and 8 are written to the bus |
| 11. | | Idle |
| Etc. | | |

As before, the system waits for 1 clock cycle, then begins to receive one word per clock cycle. This and the other examples demonstrate how the staging buffers are used as necessary to match the internal vs system word sizes, as well as clock speed, for optimum performance.

Figure 9D:
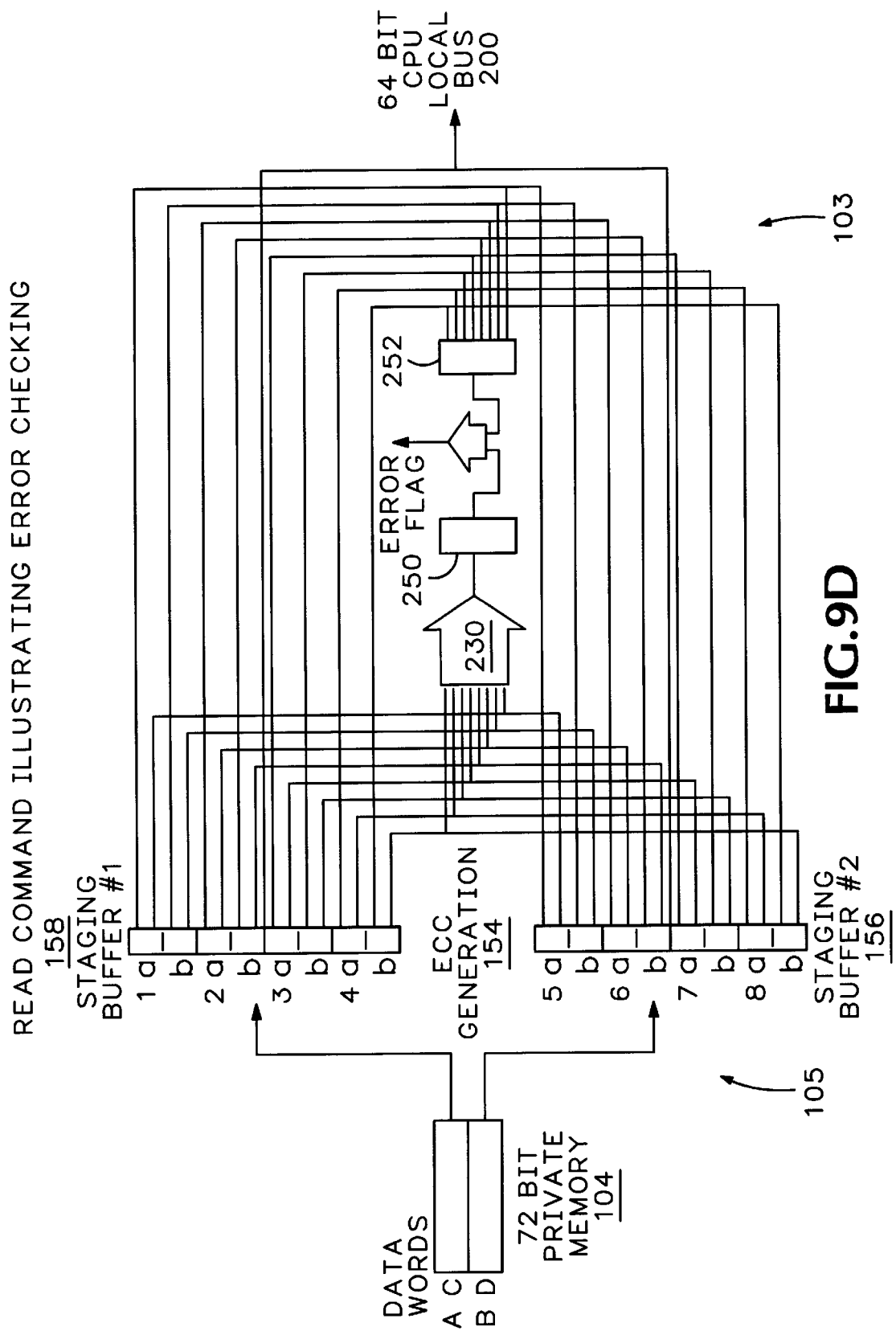

FIG. 9D illustrates a read operation and error checking in a mass storage system apparatus having a 72-bit private memory word size, coupled to a 64-bit local CPU bus. Timing and sequence of the read operation are shown in the following table:

TABLE 5D

Read Operation (see FIG. 9D)
64-bit bus, 72-bit Private Memory

| Mass Storage System Clock | System Clock | Action |
|---|---|---|
| 1. | | Outgoing word A written to staging buffer 1, ECC stripped |
| 2. | 1 | Staging buffer 1 ECC generated and compared to stripped bits |
| 3. | | Outgoing word B written to staging buffer 2, ECC stripped |
| 4. | 2 | Staging buffer 1 written to bus Staging buffer 2 ECC generated and compared to stripped bits |
| 5. | | Outgoing word C written to staging buffer 1, ECC stripped |
| 6. | 3 | Staging buffer 2 written to the bus |
| 7. | | Staging buffer 1 ECC generated and compared to stripped bits |
| 8. | 4 | Staging buffer 1 written to the bus Outgoing word D written to staging buffer 2, ECC stripped |
| 9. | | Staging buffer 2 ECC generated and compared to stripped bits |
| 10. | 5 | Staging buffers 2 written to the bus |
| Etc. | | |

Access Times

Mass Storage system data access times depend upon the speed and ability of the computer CPU local bus and will typically be less than 1 Microsecond. The mass storage system offers seek times measured in Mass Storage system clock cycles. For example, if the CPU clock is running at 50 Mhz, and if the mass storage system at 100 Mhz uses six clock cycles to access data, then the mass storage system seek time would be at most 60 Nanoseconds (0.00006 Milliseconds). However, because the mass storage system will typically run internally much faster than the bus to which it is connected, the mass storage system will typically have data ready for the system before the system is ready for the data.

An additional benefit is realized because the CPU local bus is usually wider (more bits) than the system bus. For example, a 32 bit CPU running with a 16 bit ISA bus. This means that not only is the data accessed much more rapidly, it will also be transmitted much faster across the wider bus. A 50 Mhz CPU with a 64 bit data bus that can transfer a word per system clock will enjoy a 400 MB per second data transfer rate from the mass storage system. For comparison, an expensive SCD with the SCSI interface can theoretically transfer 5 MB per second but typically realizes 2.5 MB per second transfer rates.

Ignoring the protocol and interface delays and comparing a high-speed (16 Millisecond) disk drive's seek time to that of the mass storage system (0.00006 Millisecond) we find that the mass storage system is over 266,667 times faster than the high-speed drive.

If we include device and protocol overhead, the mass storage system is at least 2.6 million times faster than the 16-Ms high-speed disk drive. Disk access time is non-productive time in that the computer user is waiting for the computer to finish the disk access operation and is accomplishing no work. The mass storage system reduces 31.11 days of non-productive high-speed SCSI access time to approximately one second.

Data Scrubbing

Data scrubbing is the generic name for a method of reading stored information and error correction codes, checking the information against the codes and repairing any detected errors found in the data. Data scrubbing has been employed in traditional disk drives and in very expensive solid-state disk drives to improve reliability. Improved data transfer methods must account for data scrubbing, particularly in view of the ever increasing capacity of computer data storage means. According to the present invention, data scrubbing is accomplished during idle time or during memory refresh. Read and Write requests have higher priority and will override data scrubbing activities.

Specifically, the mass storage system is arranged to read a data paragraph during memory refresh or during a correction cycle, and pass the paragraph through the error detection and correction circuitry, as described above. Each data paragraph may require one or more reads depending upon the internal word size and number of data lines. The error correction circuitry strips off the ECC bits to recover the original ECC. A new ECC is generated and compared to the original. If both ECC are identical, the mass storage system proceeds to the next data paragraph. If an error is detected, the original ECC is used to determine if the error consists of more than one bit.

Table 14A illustrates the timing and sequence of error correction in a mass storage system having an 18-bit private memory word size:

TABLE 14A

Example of Error Correcting Technique
(18-bit Private Memory)

| Mass Storage System Clock | Clock Cycles |
|---|---|
| 1. | Word (with error) written from private memory to staging buffer segment 1, ECC stripped |
| 2. | Word written from private memory to staging buffer segment 2, ECC stripped |
| 3. | Word written from private memory to staging buffer segment 3, ECC stripped |
| 4. | Word written from private memory to staging buffer segment 4, ECC stripped |
| 5. | ECC generated and compared, error detected |
| 6. | Error decoded and bit in staging buffer 1 repaired, counter reset, write command invoked |
| 7. | Corrected word written to private memory from staging buffer segment 1 |
| 8. | Corrected word written to private memory from staging buffer segment 2 |
| 9. | Corrected word written to private memory from staging buffer segment 3 |
| 10. | Corrected word written to private memory from staging buffer segment 4 |
| 11. | Counter reset, read command invoked |
| 12. | Word written from private memory to staging buffer segment 1, ECC stripped |
| 13. | Word written from private memory to staging buffer segment 2, ECC stripped |
| 14. | Word written from private memory to staging buffer segment 3, ECC stripped |
| 15. | Word written from private memory to staging buffer segment 4, ECC stripped |
| 16. | ECC generated and compared |
| 17. | If error again, correct and transmit, generate operating system error message, chip failure: chip # Else transmit as normal |

Here it may be observed that the error correction resulted in a system bus hold for a period of five system bus clock cycles. Based upon industry measurements, a 8-MB array of DRAM will suffer a one-bit error approximately once a month. A two or more bit error in the same memory array will occur only once every 12,000 years. These serious errors cannot be repaired and are reported in a manner dependent upon the host computer system interface.

Table 14B illustrates the timing and sequence of error correction in a mass storage system having an 36-bit private memory word size:

TABLE 14B

Example of Error Correcting Technique
36-Bit Private Memory

| Mass Storage System Clock | Clock Cycles |
|---|---|
| 1. | Word (with error) written from private memory to staging buffer segments 1 and 2, ECC stripped |
| 2. | Word written from private memory to staging buffer segments 3 and 4, ECC stripped |
| 3. | ECC generated and compared, error detected |
| 4. | Error decoded and bit in staging buffer segment 1 or 2 repaired, counter reset, write command invoked |
| 5. | Corrected word written to private memory from staging buffer segment 1 and 2 |
| 6. | Corrected word written to private memory from staging buffer segment 3 and 4 |
| 7. | Counter reset, read command invoked |
| 8. | Word written from private memory to staging buffer segments 1 and 2, ECC stripped |
| 9. | Word written from private memory to staging buffer segments 3 and 4, ECC stripped |
| 10. | ECC generated and compared |
| 11. | If error again, correct and transmit, generate operating system error message, chip failure: chip # Else transmit as normal |

In this case, the error repair cost a four bus clock cycle delay hold. Finally, Table 14C illustrates the timing and sequence of error correction in a mass storage system having an 72-bit private memory word size:

TABLE 14C

Example of Error Correcting Technique
72-Bit Private Memory

| Mass Storage System Clock | Clock Cycles |
|---|---|
| 1. | Word (with error) written from private memory to staging buffer segment 1, ECC stripped |
| 2. | ECC generated and compared, error detected |
| 3. | Error decoded and bit in staging buffer segment 1 repaired, counter reset, write command invoked |
| 4. | Corrected word written to private memory from staging buffer 1 |
| 5. | Counter reset, read command invoked |
| 6. | Word written from private memory to staging buffer 1, ECC stripped |
| 7. | ECC generated and compared |
| 8. | If error again, correct and transmit, generate operating system error message, chip failure: chip # Else transmit as normal |

Here, the error repair required only a two clock cycle hold on the system bus.

Bus Master

For use in systems in which a device other than the CPU may become the bus master, the mass storage system is configured to take control of the CPU local bus. This feature allows the mass storage system to communicate directly with system memory or with any controller attached to the local bus, such as a DMA or system bus controller, a graphics co-processor or network connection. This direct access essentially bypasses the system CPU and thus frees it to continue with system tasks. Instead of the CPU moving stored data to internal registers and from there to system memory (twice over the CPU bus), the CPU can instruct the mass storage system to transmit or read the requested data directly to or from system memory or another device. The result is that the data moves in less time than required previously and the CPU is free to continue with other program tasks. CPUs having internal program and data caching will be especially efficient under these conditions.

The mass storage system described herein may be easily adapted to interface to any bus. For example, the mass storage system may be designed (and ultimately fabricated) by modeling it using software engineering tools. To adapt the mass storage system to another bus, the design model that describes the bus electrical connections and command set is edited to reflect the differences and then the new model is compiled.

Single Chip Implementation

Figure 12:
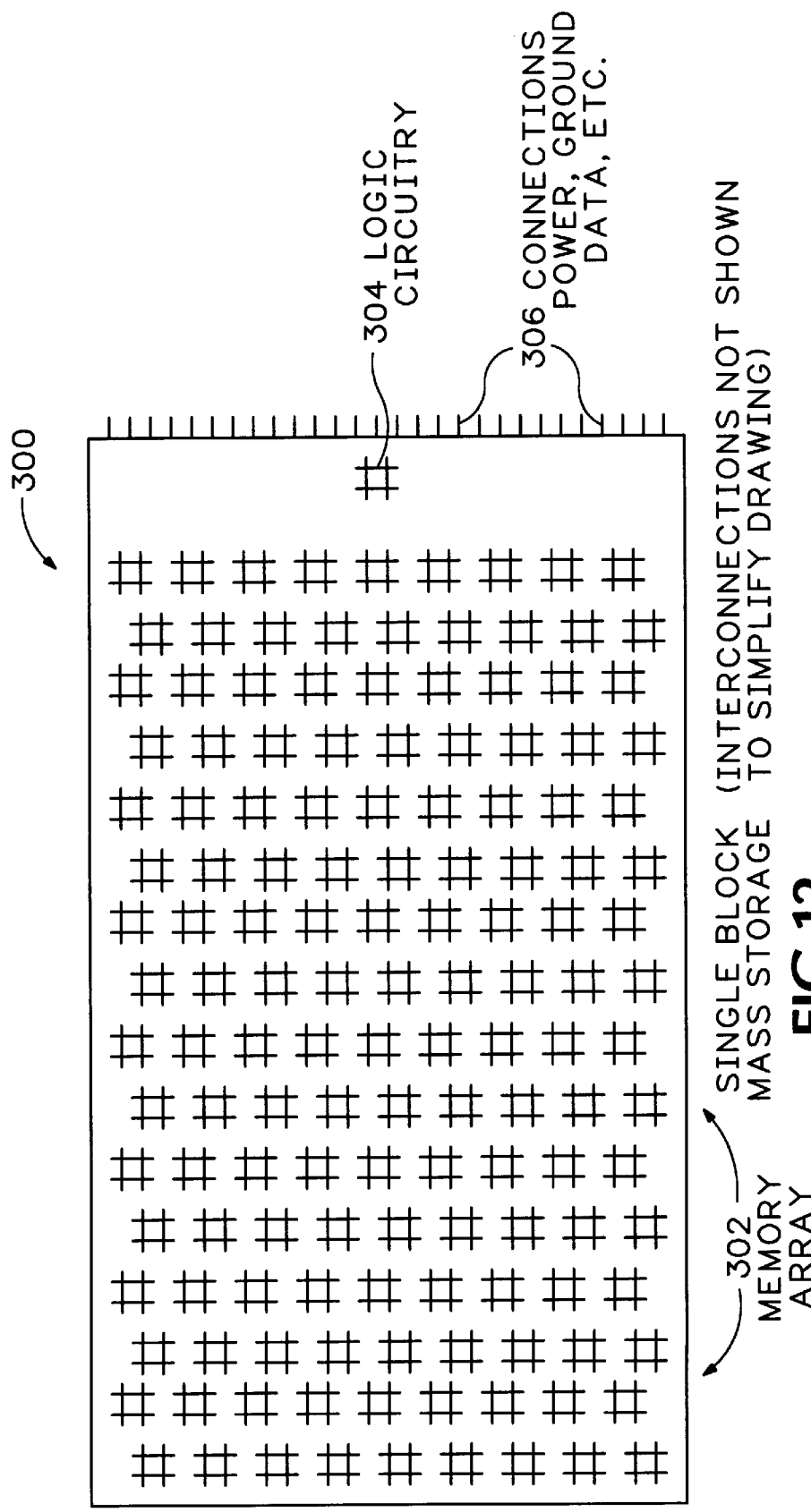
FIG. 12 conceptually illustrates implementation of a mass storage system as a single integrated circuit chip.

FIG. 12 conceptually illustrates implementation of a mass storage system as a single integrated circuit chip. The single chip implementation may include, for example, 256-MB of private memory. It is expected that a very popular size for the single chip implementation will be 64-MB. All mass storage system functionality can be implemented into a single ceramic, monolithic silicon or other similar material block which contains all memory and other circuitry. This can be accomplished by combining functional silicon substrates (e.g. memory components) with the control substrate and all required electrical connections in a single block. For example, 144 16-Mbit substrates could be interconnected to form the 256 MB memory array consisting of sixteen rows of 16 MB each with interconnections to the mass storage system control substrate.

Data Co-processor

A co-processor is a device that offloads CPU intensive tasks or that supplements the functionality of the CPU. For example, a math co-processor takes information from the CPU that expresses a command and provides data to be manipulated. The math co-processor manipulates the data according to the command and returns an answer to the CPU.

In the case of data storage, the CPU usually expects that what goes in is what comes out. The CPU may specify an operation to be performed upon the data that will affect the volume of storage required for the data or the nature of the data. In one example, there may be three methods for storing the data, straight as read, compacted using a compression algorithm or encrypted in some fashion with a key provided by the user or operating system. In computer systems where this functionality is desirable, the mass storage system can be constructed either to respond to individual commands or to have a steady state which is settable by commands. Note that the ability to co-process data is not a fundamental requirement for the mass storage system. Rather, it is one example of options that may or may not be implemented depending on the desired application. Various storage methods may be implemented within the mass storage system architecture as described.

Multiple Data Transfers

Data stored in the mass storage system does not require a double transfer across the system bus. Data is transferred once across the system bus, as the mass storage system itself (including associated private memory) resides on the computer's CPU local bus. In a minimal implementation of the invention, data would move into system memory at local bus speeds and then would be transferred to the output controller or port across the system bus. In a system with a DMA controller, a minimal mass storage system could transfer directly to the DMA controller via the system bus.

In applications having a CPU Local Cache, the mass storage system can be used to load programs or data directly into the appropriate CPU's cache memory. In the case of execution images, there are two approaches possible. The actual implementation is dependent upon the CPU. As each CPU differs, the implementation for that CPU will differ. Basically, in the first method, the mass storage system is the sole source of CPU cache loading. This is known as "Execute In Place". In the second method, the CPU cache is loaded first, and then the remainder of the first packet of program image is loaded into system memory. While the CPU is accessing the cache memory, the local bus is free. During this free time, the mass storage system loads the remainder of the program image into system main memory, halting as necessary to permit the CPU access to the local bus.

Advantages

Because the read command is the most complex operation performed by a storage device, we examine the mass storage system read operation in closer detail for comparison to known technologies. To compare the existing technologies to the present invention, the data pipeline for an 8 MB file read under MS-DOS is evaluated for a high speed SCSI disk drive, a solid-state semiconductor disk drive (SCD), an expansion RAM disk, and the present mass storage system. The time under evaluation will be from when the MS-DOS operating system issues the read command until the information is available to the CPU or in the case of direct memory access devices, written to system memory.

Most files are stored on disk in non-contiguous blocks of storage. This is called fragmentation. If a file experiences 25% fragmentation, then one out of every 4 disk sectors requires a disk seek. A disk sector is typically 512 bytes, thus the 8 MB file occupies 16384 sectors.

When MS-DOS reads a file, it goes through several steps. The first is that a special file called a DIR is read. Information in the DIR file tells MS-DOS which section of another special file, the File Allocation Table (FAT) is to be read. The FAT then tells MS-DOS where on the disk the actual file resides. Because the FAT file resides very closely to the DIR file, the head of the disk need move only a few tracks at most to read the file. For the purpose of this discussion, we will assume a two track differential. Assume that a device read command causes two sectors to be read, that is, 1024 bytes per read. Further, we will assume that the 8 MB file suffers from 15% fragmentation.

For the purposes of this discussion, let us define the types of reads that will occur during the file transfer. Please refer to Table 6. The four types of read are "seek read" in which the disk head must move to the correct cylinder of the disk, "subsequent track read" in which the head is already in the correct position, "track read" where the head must move one track in either direction, and "FAT read" where the DOS file allocation table is accessed usually requiring a move of several tracks.

TABLE 6

Types of disk file reads

| | | |
|---|---|---|
| 1. | Seek read | The disk head must seek to the track to be read |
| 2. | Subsequent read | The disk head is already aligned on the proper track. |
| 3. | Track read | The disk head must move to the next track |
| 4. | FAT read | The disk head must move at least 2 tracks |

A typical SCSI hard disk spins at 3600 RPM. Each track contains 17 sectors of 512 bytes each with an 18th sector unused. Assume that average rotational latency is one half the time to spin the disk one time and that optimized rotational latency means that the next sector is available for reading on average one sector's rotation after the device is ready to read the sector. Device interleaf is assumed to be 1:1. Thus, average rotational latency is assumed to be 8333.33 Microseconds and average optimized rotational latency is assumed to be 925.93 Microseconds.

The SCSI disk suffers from SCSI protocol delays. Let p1 represent the timing delays attendant with command protocols and let p2 represent the overhead attendant with a synchronous data transfers on the SCSI bus (the most common mode of data transmission on a SCSI bus today.) For the purpose of discussion, let us assume that the high-level command protocol, p1, takes approximately 17.2 microseconds and that the low-level data transfer protocol, p2, takes approximately 307.2 microseconds for each block transfer. Note that we only consider two protocol sequences out of many and therefore are generous to the SCSI disk in computing protocol overhead.

The RAM disk suffers from system software overhead, (a). An analysis of a typical RAM disk driver will show that there are approximately 806 system clock cycles required for each transfer. In a 20 Mhz system, the value of a is approximately 40.8 Microseconds.

The maximum transfer size for a RAM disk is 64 KB because of limitations placed on buffer sized by MS-DOS. Because of this limitation, the maximum transfer size is limited to 128 contiguous 512 byte sectors. For convenience, let us define a RAM disk read caused by reaching the 64 KB limit as a track read. Times involved in various types of reads are computed using the figures from Table 7, in which all operations involved in a read operation are listed.

TABLE 7

Timing factors involved with a file read

| Item (Time in Microseconds) | SCSI | RAM disk | Mass Storage System |
|---|---|---|---|
| Address Computation | 0 | a | 0 |
| Controller decode | 30 | 0.1 | 0.02 |
| Command Protocol overhead | p1 | 0 | 0 |
| Device seek | 16000 | 0 | 0 |
| Rotational latency, initial | 8333.333 | 0 | 0 |
| Rotational latency, optimized read | 925.9259 | 0 | 0 |
| Read sector to buffer | 925.9259 | 0 | 0 |
| Transmission Protocol overhead | p2 | 0 | 0 |
| Transmit data to controller | 227.5556 | 0 | 0 |
| Write data to output buffer | 0.5 | 0.5 | 0.1 |
| First Data to Local Bus | 125 | 125 | 0 |
| Track to Track | 5000 | 0 | 0 |

Using the above times results in the four read type times, (less protocol and software overhead), in microseconds illustrated in Table 8 as follows:

TABLE 8

File Read Timings in Microseconds (Sans Protocols) in microseconds

| Item | SCSI | RAM disk | Mass Storage System |
|---|---|---|---|
| Seek read | 34,517.31 | 0.6 | 0.12 |
| Subsequent read | 2,109.91 | 0.6 | 0.12 |
| Track read | 14,517.31 | 0.6 | 0.12 |
| FAT read | 12,109.91 | 0.6 | 0.12 |

An 8 MB file consists of 16384 sectors on 964 tracks or of 128 packets of 64 KB. MS-DOS will access the file as illustrated in Table 9 in which the number of each file type read are listed, viz:

TABLE 9

8-MB MS-DOS file read Count of read types involved

| Task | Item | SCSI | RAM disk | Mass Storage System |
|---|---|---|---|---|
| Read Dir | Seek read | 1 | 1 | 1 |
| | Subsequent read | 1 | 1 | 0 |
| Read FAT | FAT read | 1 | 1 | 1 |
| | Subsequent read | 14 | 14 | 0 |
| | Track read | 1 | 1 | 0 |
| Read File | Initial seek read | 1 | 1 | 1 |
| | Fragmentation seek read | 154 | 154 | 154 |
| | Track read | 870 | 129 | 0 |
| | Subsequent reads | 15360 | 0 | 0 |
| Total reads | | 16403 | 302 | 173 |

This inventory of read operations results in device timings, set forth in Table 10 as follows:

TABLE 10

8 MB MS-DOS Device Overhead Times in Microseconds

| Read type | SCSI | RAM disk | Mass Storage System |
|---|---|---|---|
| Seek Reads | 5384701 | 93.6 | 18.72 |
| Subsequent Reads | 32439826 | 9 | 1.8 |
| Track Reads | 12644581 | 78 | 0.12 |
| FAT reads | 12109.91 | 0.6 | 0.12 |
| Total Microseconds | 50481219 | 181.2 | 20.76 |

The foregoing analysis assumes protocol and software overhead timings, (in microseconds), as illustrated in Table 11, viz:

TABLE 11

8 MB MS-DOS File Read Protocol and Software Overhead (in Microseconds)

| Protocol | SCSI | RAM disk | Mass Storage System |
|---|---|---|---|
| p1 | 282,131.6 | 0 | 0 |
| p2 | 5,039,002 | 0 | 0 |
| a | 0 | 15,312.25 | 0 |
| Total Microseconds | 5,321,133 | 15,213.250 | 0 |

The read operation has approximately the following total overhead times (in microseconds): SCSI: 55,802,352; RAM Disk: 15,394.55; and Mass Storage System: 20.76. Therefore, total overhead times can be expressed by the following relationships: SCSI: 5039002+16,403 (p1+p2); for RAM Disk: 181.2+302*a; and Mass Storage System 20.76. If the above approximations for p1, p2 and a are assumed to be correct, protocol and software overhead can be defined by the following percentages of total overhead: SCSI: 9.536%; RAM Disk 98.82%; and Mass Storage System 0%.

Table 12 presents a comparison of a standard SCSI disk drive with a 16 Millisecond access time to a Mass Storage System in reading an 8 MB file that is fragmented 15%.

TABLE 12

Comparison of 256 MB Mass Storage System with 256 MB SCS Disk (Time in Microseconds)

| Item | 16 MSec SCSI disk | Mass Storage System | Improvement Factor |
|---|---|---|---|
| Device Overhead | 50481219 | 20.76 | 2,431,658 |
| Protocol Overhead | 5321133 | 0 | ∞ |
| Total Overhead | 55802352 | 20.76 | 2,687,975 |
| Approximate Cost | $1,000.00 | $20,000.00 | 0.05 |
| Cost per MB | $3.13 | $78.12 | 0.4 |

Table 13 compares a SCSI SCD drive to the disclosed Mass Storage System reading the same file. In this example we find that the Mass Storage System enjoys an overall improvement factor of 462,842.9

If a large expansion 256-MB RAM disk existed, it would compare to the mass storage system as illustrated in Table 13, as follows:

TABLE 13

Comparison of a 256-MB Mass Storage System to an Imaginary 256-MB RAM disk
Overhead Reading an 8-MB MS-DOS file
(All times in Microseconds)

| Item | Imaginary RAM disk | Mass Storage System | Improvement Factor |
|---|---|---|---|
| Device Overhead | 181.2 | 20.76 | 9 |
| Software Overhead | 15,213.25 | 0 | ∞ |
| Total Overhead | 15,394.45 | 20.76 | 741.5 |
| Approximate Cost | No such device | $20,000.00 | ∞ |
| per MB | No such device | $78.12 | ∞ |

Because of the short Mean Time Between Failures in an uncorrected large memory array, RAM disks of such size do not exist. The Mass Storage System can be expected to perform faster than the RAM disk by a factor of 15,394. The Mass Storage System with the file system has a factor of 128,287.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims:

What is claimed is:

1. A mass storage apparatus for connection to a computer system having a CPU coupled to a CPU local bus, to provide data storage, the apparatus comprising:
   a private solid-state random access memory for storing data;
   interface means coupled to the CPU local bus for interfacing directly with the CPU local bus, the interface means including a plurality of staging buffers for moving data from the private memory to the CPU local bus to effect a read operation and for moving data from the CPU local bus to the private memory to effect a write operation; and
   logic means coupled to the private memory and to the interface means for controlling access to the private memory by moving data between the staging buffers and the private memory independently of the computer system CPU.

2. A mass storage apparatus according to claim 1 wherein the private memory is isolated from the CPU local bus in that the private memory is accessible to the CPU local bus only through the staging buffers and under control of the logic means.

3. A mass storage apparatus according to claim 1 further comprising means for operating the staging buffers in parallel so as to match the CPU local bus word size to the private memory word size when moving data between the staging buffers and the CPU local bus.

4. A mass storage apparatus according to claim 1 further comprising means for decoupling the staging buffers from the CPU local bus so as to allow CPU local bus data transfers and data transfers within the mass storage apparatus to be accomplished independently of each other.

5. A mass storage apparatus according to claim 1 wherein the logic means includes:
   means for generating error codes from data received in the staging buffers from the CPU local bus during a write operation;
   means for adding the generated error codes to the received data, so as to form a data paragraph comprising error codes interleaved among the received data; and
   means for storing the data paragraph in the private memory to complete the write operation.

6. A mass storage apparatus according to claim 5, the logic means further comprising:
   means for transmitting data from the staging buffers to the CPU local bus to effect a read operation;
   means intermediate the staging buffers and the private memory for checking said data transmitted to the CPU local bus so as to detect errors during transmission; and
   means for repairing detected errors during data transmission.

7. A mass storage apparatus according to claim 5 further comprising:
   scrubbing means for continuously checking data and error codes stored in said private memory to detect a memory error if one has occurred; and
   means for repairing memory errors detected in the private memory during said continuous checking of stored data and error codes.

8. A mass storage apparatus according to claim 5 wherein the logic means includes:
   means for transferring the data between the private memory and the CPU local bus in the form of variable-length data packets.

9. A mass storage apparatus according to claim 5 including means for addressing the private memory in variable length sections, whereby the mass storage apparatus can be used to provide random access variable-packet-sized continuously error-corrected computer system primary or secondary memory.

10. A mass storage apparatus according to claim 5, the logic means further comprising:
    means for stripping the interleaved error codes from a stored data paragraph while moving stored data from the private memory to the CPU local bus to effect a read operation;
    means for generating error codes during the read operation, based on the data stored in the data paragraph; and
    means for comparing the stripped error codes to the generated error codes to detect an error in the stored data paragraph, thereby checking the stored data for errors during the read operation.

11. A mass storage apparatus according to claim 1 wherein the private memory comprises semiconductor memory.

12. A mass storage apparatus according to claim 1 wherein the private memory is non-volatile.

13. A mass storage apparatus according to claim 1 further comprising back-up means for powering the private memory so as to preserve data stored in the private memory even in the event of failure of the computer system power.

14. A mass storage apparatus according to claim 1 wherein the logic means includes means for storing data in the private memory as a series of data paragraphs, each data paragraph having a predetermined size and further comprising decoding means for converting a requested address and length into a data paragraph address and data paragraph count whereby said requested data is accessed in fixed or variable length segments of said private memory, each segment consisting of at least one data paragraph in a single packet.

15. A mass storage apparatus for use in a computer system having a CPU local bus, the mass storage apparatus being directly coupled to the CPU local bus, comprising:
    a private memory including an array of random access memory for storing digital data provided to the mass storage apparatus via the CPU local bus;
    generating means for generating error correction codes responsive to the digital data; and
    controller means coupled to the generating means and coupled to the private memory for controlling transfer of the digital data from the CPU local bus to the private memory and storing the generated error correction codes together with the corresponding digital data in the private memory.

16. A mass storage apparatus according to claim 15 wherein the controller means are arranged so as to store the error correction codes interleaved among the corresponding digital data in the private memory, thereby forming a stored data paragraph in the private memory consisting of data bits together with corresponding error correction code bits interleaved among the data bits.

17. A mass storage apparatus according to claim 16 wherein the digital data comprises 64-bit words and the generating means provides one error correction code bit for each eight-bit byte of digital data, so that the stored data paragraph comprises 72 bits.

18. A mass storage apparatus according to claim 16 further comprising error correction code testing means including:
    means (902,904) for coupling the private memory (104) to the generating means (230) such that the generating means generates an error correction byte (250) responsive to the data bits (908,912) of a stored data paragraph (A1-B2) received from the private memory;
    means (906,910) for stripping the interleaved error correction code bits from the stored data paragraph so as to form a recovered error correction byte (252);
    means (920) for comparing the error correction byte (250) generated in response to the data bits to the recovered error correction byte (252) and indicating an error (922) if the error correction bytes do not match.

19. A mass storage apparatus according to claim 15 further comprising:
    interface means coupled to the generation means and the controller means and arranged for direct connection to the CPU local bus, the interface means including at least two staging buffers for data transfer between the private memory and the CPU local bus; and
    means for forming a data paragraph in the staging buffers when the CPU local bus word size is less than a predetermined data paragraph size.

20. A mass storage apparatus according to claim 19 wherein the interface means further includes:
- an address register for receiving address information from the local CPU bus for read operations; and
- a command register for receiving commands from the local CPU bus to effect corresponding mass storage access operations.

21. In a computer system having a system clock, a CPU local bus and a private memory and at least one staging buffer directly coupled to the CPU local bus, a method of reading a file stored in the private memory, the stored file comprising a series of data paragraphs, and the method comprising the steps of:
- determining a starting address in the private memory corresponding to a first one of the series of stored data paragraphs;
- beginning at the starting address, reading the series of stored data paragraphs one at a time from the private memory into the staging buffer; and
- matching said sequentially reading the series of stored data paragraphs with the system clock so as to form a new system word of data in the staging buffer for each cycle of the system clock;
- and then writing the contents of the staging buffer onto the CPU local bus at a rate of one system word of data for each cycle of the system clock; whereby the read operation proceeds at system clock speed without wait states.

22. A method of reading a file according to claim 21 wherein said step of sequentially reading the series of stored data paragraphs from the private memory includes checking each stored data paragraph, as it is read from the private memory, to detect any errors.

23. A method of reading a file according to claim 22 wherein each stored data paragraph includes interleaved error correction code bits and said checking step includes:
- generating error correction code bits responsive to the data bits of the stored data paragraph;
- recovering the interleaved error correction code bits from the stored data paragraph; and
- comparing the error correction code bits generated in response to the data bits to the interleaved error correction code bits recovered from the stored data paragraph and indicating an error if the error correction code bits do not match.

24. A method of reading a file according to claim 23 further comprising, if an error is indicated:
- delaying said writing the contents of the staging buffer onto the CPU local bus;
- correcting the stored data paragraph in the private memory;
- overwriting the corresponding staging buffer with the corrected stored data;
- repeating said checking step with respect to the corrected stored data paragraph; and,
if no error is indicated, writing the corrected stored data paragraph to the CPU local bus.

25. A method of reading a file according to claim 24 further comprising, if repeating errors are indicated, indicating a memory hardware failure.

26. A method of reading a file according to claim 23 and further comprising:
- determining a stored data paragraph size;
- determining the CPU local bus word size;
- comparing the stored data paragraph size to the CPU local bus word size;
- if the stored data paragraph size is equal to the CPU local bus word size, writing the series of stored data paragraphs, without the error correction bits, directly onto the CPU local bus without first writing the data into the staging buffer;
- providing at least a first register directly accessible to the CPU local bus;
- if an error is indicated in one of the series of stored data paragraphs, reporting the indicated error by writing an indication of the error into the first register;
- if the error is indicated and the indicated error can be corrected, correcting the one of the series of stored data paragraphs having the error using the error correction bits in order to obtain a corrected stored data paragraph; and
- rewriting the corrected stored data paragraph to the CPU local bus.

27. A method of reading a file according to claim 21 further comprising directly transferring data between the staging buffer and apparatus other than the CPU coupled to the local CPU bus, whereby the CPU is free to continue execution of program tasks other than data transfer.

* * * * *